United States Patent
Rajappa

[15] 3,674,786
[45] July 4, 1972

[54] NEW-6-AMINO-4-OXO-4,5-DIHYDRO-ISOTHIAZOLO[5,4-D]PYRIMIDINES

[72] Inventor: Srinivasachari Rajappa, Bombay, India
[73] Assignee: Ciba-Geigy Corporation, Summit, N.J.
[22] Filed: Oct. 10, 1969
[21] Appl. No.: 865,477

[30] Foreign Application Priority Data

Oct. 17, 1968 Switzerland..........................15560/68
Sept. 15, 1969 Switzerland..........................13989/69

[52] U.S. Cl..................260/247.1, 260/243 B, 260/256.5 R, 424/248
[51] Int. Cl. .......................................................C07d 87/46
[58] Field of Search......................260/247.1, 265.5 R, 243 B Primary Examiner—Alex Mazel
Assistant Examiner—Jose Tovar
Attorney—Harry Goldsmith, Joseph G. Kolodny and Mario A. Monaco

[57] ABSTRACT

Compounds of the formula

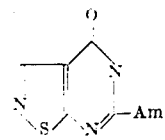

in which Am stands for optionally substituted amino, and which are substituted in 3-position and optionally substituted in 5-position are useful as central depressant and hypnotic-sedative agents.

9 Claims, No Drawings

-6-AMINO-4-OXO-4,5-DIHYDRO-ISOTHIAZOLO[5,4-D]PYRIMIDINES

SUMMARY OF THE INVENTION

The present invention relates to new 6-amino-4-oxo-4,5 dihydroisothiazolo[5,4-d]pyrimidines having the nucleus of the formula

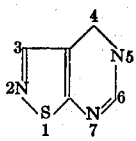

especially those, in which the 3-position contains an optionally substituted hydrocarbon residue, and the 5-position is unsubstituted or substituted by an optionally substituted hydrocarbon residue or a heterocyclic residue of aromatic nature or a heterocyclic-aliphatic residue, in which the heterocyclic residue is of aromatic nature, or tautomers thereof, and their salts, as well as pharmaceutical compositions containing these compounds, and a pro-cess for treating insomnia consisting in administering such compositions to warm-blooded beings.

The amino group represents a primary, secondary or particularly tertiary amino group. In the latter two, the nitrogen contains optionally substituted aliphatic, cycloaliphatic, cycloaliphatic-aliphatic, aromatic or araliphatic hydrocarbon residues as substituents; when taken together, two substituents also represent an optionally substituted bivalent aliphatic hydrocarbon residue, in which the chain carbon atoms may be interrupted by hetero atoms.

Hydrocarbon residues in 3-position are primarily aliphatic, cycloaliphatic and cycloaliphatic-aliphatic, as well as aromatic or araliphatic hydrocarbon residues, aliphatic and cycloaliphatic residues being advantageously saturated. In cycloaliphatic and cycloaliphatic-aliphatic residues, the cyclic portion is preferably a monocyclic, but may also be a bicyclic or polycyclic residue.

An optionally substituted hydrocarbon residue representing the substituent of the 5-position is an optionally substituted aliphatic, cycloaliphatic, cycloaliphatic-aliphatic, aromatic or araliphatic hydrocarbon residue. In cycloaliphatic, cycloaliphatic-aliphatic, aromatic and araliphatic residues, the cyclic portion is preferably a monocyclic, but also a polycyclic residue.

In a heterocyclic or heterocyclic-aliphatic residue in 5-position, the heterocyclic portion is preferably represented by a monocyclic or bicyclic, azacyclic, oxacyclic or thiacyclic residue of aromatic characteristics.

The term "lower", used in this context in connection with the definition of organic compounds, residues or radicals, modifies such compounds, residues and radicals as having preferably up to seven carbon atoms.

An aliphatic hydrocarbon residue is primarily an alkyl, as well as an alkenyl or alkinyl radical, particularly straight or branched lower alkyl, as well as lower alkenyl or lower alkinyl radical, which may be bound in any suitable position. Substituents of aliphatic hydrocarbon radicals are, for example, free, etherified or esterified hydroxyl or mercapto groups, such as lower alkoxy, lower alkenyloxy or lower alkyl-mercapto groups, or halogen atoms, or amino, particularly tert.-amino groups, such as those mentioned above and below.

A cycloaliphatic hydrocarbon residue is primarily a monocyclic or polycyclic cycloalkyl residue having, for example, up to and including 12, preferably three to ten ring carbon atoms. It may also stand for a monocyclic or polycyclic cycloalkenyl radical, having, for example, up to and including 12, preferably five to ten ring carbon atoms. In a cycloaliphatic-aliphatic hydrocarbon radical, the cycloaliphatic residue has e.g. the above given meaning and stands primarily for a monocyclic or polycyclic cycloalkyl, as well as for a corresponding cycloalkenyl radical. The aliphatic portion of such cycloaliphatic-aliphatic radical is, for example, an alkylene, primarily a lower alkylene, as well as an alkenylene, e.g. a lower alkenylene grouping. In the above cycloaliphatic and cycloaliphatic-aliphatic hydrocarbon residues, the ring- and chain-carbon atoms may be substituted, for example, by optionally substituted aliphatic hydrocarbon residues, such as lower alkyl or halogeno-lower alkyl groups, or by the previously mentioned free, etherified or esterified hydroxyl or mercapto groups or amino, particularly tert.-amino groups.

An aromatic hydrocarbon radical, including the aromatic portion of an araliphatic hydrocarbon residue, is primarily a monocyclic, as well as a bicyclic aromatic hydrocarbon residue, particularly a phenyl, as well as a naphthyl group. An araliphatic hydrocarbon residue is primarily an aryl-alkyl, particularly an aryl-lower alkyl, e.g. phenyl-lower alkyl, as well as naphthyl-lower alkyl residue, also an aryl-alkenyl, particularly an aryl-lower alkenyl, e.g. phenyl-lower alkenyl, as well as naphthyl-lower alkenyl residue. The aromatic hydrocarbon residue, as well as the aliphatic portion of an araliphatic hydrocarbon residue may be substituted, for example, as the above mentioned cycloaliphatic and cycloaliphatic-aliphatic residues, as well as by nitro and lower alkylenedioxy groups.

The heterocyclic residue of aromatic character, including the corresponding portion in a heterocyclic-aliphatic residue is primarily a monocyclic, as well as bicyclic, monoazacyclic, monooxacyclic or monothiacyclic radical of aromatic character, which may be substituted, for example, as the previously mentioned aromatic hydrocarbon radical, In heterocyclic-aliphatic residues, the aliphatic portion has the same meaning as in an araliphatic hydrocarbon residue.

A bivalent aliphatic hydrocarbon residue, which together with the nitrogen atom it substitutes, forms a tert.-amino group, is primarily an alkylene, as well as alkenylene radical having e.g. up to and including seven chain carbon atoms. The latter may be interrupted by e.g. an oxygen, sulfur or an optionally substituted nitrogen atom, substituents of the latter being, for example, optionally substituted aliphatic, aromatic or araliphatic hydrocarbon radicals; they may also be substituted, e.g. by optionally substituted aliphatic, aromatic or araliphatic hydrocarbon radicals. In bivalent aliphatic hydrocarbon radicals substituting the nitrogen atom of the tert. amino group, heteroatoms interrupting the chain carbon atoms are preferably separated from the amino-nitrogen atom by at least two, above all by two to three chain carbon atoms.

Lower alkyl represents e.g. methyl, ethyl, n-propyl, isopropyl, n-butyl, isobutyl, sec.-butyl, tert.-butyl, n-pentyl, isopentyl, neopentyl, n-hexyl, isohexyl or n-heptyl; lower alkenyl is e.g. vinyl, allyl or methallyl, and lower alkinyl e.g. propargyl.

Lower alkoxy is, for example, methoxy, ethoxy, n-propyloxy, isopropyloxy or n-butyloxy, and lower alkenyloxy for example, vinyloxy or allyloxy.

Lower alkyl-mercapto is, for example, methylmercapto or ethylmercapto.

Halogen atoms are primarily those with an atomic weight of less than 80, i.e. fluorine, chlorine or bromine, but also iodine atoms.

A cycloalkyl group is e.g. cyclopropyl, cyclobutyl, cyclopentyl, cyclohexyl, cycloheptyl or adamantyl, a cycloalkenyl group, e.g. 2- or 3-cyclopentenyl, or 2- or 3-cyclohexenyl.

A cycloalkyl-lower alkyl group is, for example, cyclopropylmethyl, -1,1- or -1,2-ethyl, cyclopentylmethyl, -1,1- or -1,2-ethyl, or -1,2- or 1,3-propyl, cyclohexylmethyl, -1,1- or -1,2-ethyl, or 1,2- or -1,3-propyl, or cycloheptylmethyl, whereas a cycloalkenyl-lower alkyl group stands for e.g. 1-, 2- or 3-cyclopentenylmethyl, -1,1- or -1,2-ethyl, or 1-, 2or 3-cyclohexanylmethyl, -1,1- or 1,2-ethyl. A cycloalkyl-lower alkenyl group is e.g. cyclopentylvinyl or -allyl, or cyclohexylvinyl or -allyl, and a cycloalkenyl-lower alkenyl group, e.g. 2- or 3-cyclopentenylvinyl or -allyl, or 2- or 3-cyclohexenylvinyl or -allyl.

Halogeno-lower alkyl is primarily represented by trifluoromethyl.

A naphthyl residue may be a 1-naphthyl or 2-naphthyl radical.

A lower alkylenedioxy group is primarily a methylene-dioxy, as well as a 1,1 or 1,2-ethylenedioxy group.

Monoazacyclic radicals of aromatic characteristics are pyridyl, e.g. 2-, 3- or 4-pyridyl, or quinolyl or isoquinolyl, e.g. 2- or 4-quinolyl or 1-isoquinolyl radicals, whereas monooxacyclic or monothiacyclic radicals of aromatic characteristics represent furyl, e.g. 2-furyl, or thienyl, e.g. 2-thienyl radicals. Corresponding heterocyclic-aliphatic radicals are, for example, pyridyl-lower alkyl, e.g. 2- or 4-picolyl, quinolyl-lower alkyl or isoquinolyl-lower alkyl, e.g. 2- or 4-quinolylmethyl or 1-isoquinolylmethyl, furyl-lower alkyl, e.g. furfuryl, or thienyl-lower alkyl, e.g. 2-thenyl radicals.

Secondary or tertiary amino groups are, for example, N-lower alkyl-amino or N,N-di-lower alkyl-amino, e.g. methylamino, dimethylamino, ethylamino, N-ethyl-N-methylamino, diethylamino, n-propylamino, di-n-propylamino, isopropylamino, diisopropylamino or di-n-butylamino groups, N-hydroxy-lower alkylamino, N-hydroxy-lower alkyl-N-lower alkylamino or N,N-di-hydroxy-lower alkyl-amino groups, in which hydroxy groups are separated from the nitrogen atom by at least two, preferably two to three carbon atoms, e.g. 2-hydroxyethylamino, N-2-hydroxyethyl-N-methylamino or N,N-di-2-hydroxyethylamino groups, dilower alkyl-amino-lower alkyl-amino groups, in which di-lower alkyl-amino is separated from the nitrogen atom by at least two, preferably two to three carbon atoms, e.g. 2-dimethylaminoethylamino, 2-diethylaminoethylamino or 3-dimethylaminopropylamino groups, alkyleneamino-lower alkylamino groups, in which the alkylene-amino group has three to eight, preferably five to seven ring members and is separated from the nitrogen atom by at least two, preferably two to three carbon atoms, e.g. 2-pyrrolidinoethylamino or 2-piperidinoethylamino groups, oxa- or thiaalkyleneamino-lower alkyl-amino groups, in which oxa- or thiaalkyleneamino groups contain six ring members, the heteroatoms being separated by at least two carbon atoms, and is separated from the nitrogen atom by at least two, preferably two to three carbon atoms, e.g. 2-(4-morpholino)-ethylamino or 2-(4-thiomorpholino)-ethyl groups, or aza-alkyleneamino-lower alkyl-amino groups, in which the aza-ni-trogen of the azaalkyleneamino portion, which contains six to eight, preferably six ring members, the heteroatoms being separated by at least two carbon atoms, is optionally substituted, for example, by a lower alkyl group and the aza-alkyleneamino group is separated by at least two, preferably two to three carbon atoms from the nitrogen atom, e.g. 2-(4-methyl-piperazino)-ethylamino groups, cycloalkylamino or N-cycloalkyl-N-lower alkylamino, e.g. cyclohexylamino or N-cyclopentyl-N-methylamino groups, phenyl-lower alkylamino or N-phenyl-lower alkyl-N-lower alkylamino, e.g. benzylamino- or N-benzyl-N-methyl-amino, N,N-alkyleneamino having three to eight, preferably five to seven ring members, e.g. pyrrolidino, 2,5-dimethyl-pyrrolidino, piperidino, 2-methyl-piperidino, 3-ethyl-piperidino, hexa-hydro-azepino or octahydro-azocino, or N,N-alkenyleneamino preferably with 5 to 7 ring members, e.g. 1,2,5,6-tetra-hydro-1-pyridyl, N,N-azaalkyleneamino having six to eight, preferably six ring members, in which the aza-nitrogen atom is unsubstituted or preferably substituted, for example, by optionally substituted lower alkyl, phenyl, phenyl-lower alkyl or pyridyl and is separated from the amino-nitrogen by at least two carbon atoms, e.g. piperazino, 4-methyl-piperazino, or 4-(2hydroxyethyl)-piperazino, N,N-thia-alkyleneamino having preferably six ring members, in which the thia-sulfur is separated from the amino-nitrogen by at least two carbon atoms, e.g. 4-thiomorpholino or 2,6-dimethyl-4-thiomorpholino, and particularly oxaalkyleneamino having preferably six ring members, in which the oxa-oxygen is separated from the amino-nitrogen by at least two carbon atoms, e.g. 4-morpholino or 2,6-dimethyl-4-morpholino.

The new compounds show valuable pharmacological properties. Apart from psychotropic activities, they show primarily central depressant, especially hypnotic-sedative effects, as can be demonstrated, for example, in animal tests, using, for example, mice, rats, cats, rabbits and monkeys as test animals, at doses from about 0.01 g/kg to about 0.5 g/kg upon oral or intravenous administration. The new compounds are, therefore, useful as central depressant particularly as hypnotic-sedative agents. Furthermore, they can also be used as intermediates for the preparation of other useful, pharmacologically active compounds.

Especially outstanding with respect to their central depressant, particularly hypnotic-sedative effects are the 3-$R_1$-5-$R_2$-6-Am-4-oxo-4,5-dihydro-isothiazolo [5,4-d]pyrimidines of the formula

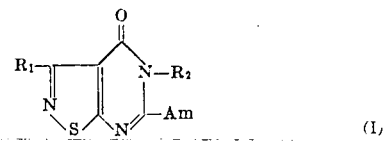

(I)

in which $R_1$ is an aliphatic hydrocarbon residue, particularly a lower alkyl group, or a cycloaliphatic or cycloaliphatic-aliphatic hydrocarbon residue, particularly a cycloalkyl-lower alkyl group, in which the cycloalkyl portion has three to seven ring members, $R_2$ is an aliphatic hydrocarbon residue, above all a lower alkyl group, as well as an aromatic or araliphatic hydrocarbon residue, which is optionally substituted in the monocyclic aryl residue by lower alkyl, lower alkoxy, trifluoromethyl or halogeno, and Am stands for a tert.-amino group, particularly an N,N-alkyleneamino group with five to seven ring members, an azaalkyleneamino group with six ring members, in which the aza-nitrogen atom is optionally substituted by a lower alkyl or hydroxyalkyl group and is separated from the amino group by two carbon atoms, or particularly an oxaalkyleneamino group with six ring members, in which the oxa-oxygen atom is separated from the amino group by two carbon atoms, in the first place a 4-morpholino group. Particularly mentioned are the 3,5-di-methyl-6-(4-morpholino)-4-oxo-4,5-dihydro-isothiazolo[5,4-d]pyrimidine, the 3-ethyl-5-methyl-6-(4-morpholino)-4-oxo-4,5-dihydro-isothiazolo[5,4-d]pyrimidine, the 5-methyl-6-(4-morpholino)-4-oxo-3-n-pentyl-4,5-dihydro-isothiazolo[5,4-d] pyrimidine, the 3-n-hexyl-5-methyl-6-(4-morpholino)-4-oxo-4,5-dihydro-isothiazolo[5,4-d]pyrimidine, the 3-cyclopentyl-methyl-5-methyl-6-(4-morpholino)-4-oxo-4,5-dihydro-isothiazolo[5,4-d]pyrimidine, the 3-n-butyl-5-methyl-6-(4-morpholino)- 4-oxo-4,5-dihydro-isothiazolo[5,4-d]pyrimidine, the 3-isopropyl-5-methyl-6-(4-morpholino)-4-oxo-4,5-dihydro-isothiazolo[5,4-d] pyrimidine, the 3-n-heptyl-5-methyl-6-(4-morpholino)-4-oxo-4,5-dihydro-isothiazolo[5,4-d]pyrimidine, the 3-sec.-butyl-5-methyl-6-(4-morpholino)-4-oxo-4,5-dihydro-isothiazolo[5,4-d]pyrimidine and the 3-n-propyl-5-methyl-6-(4-morpholino)-4-oxo-4,5-dihydro-isothiazolo[5,4-d]pyrimidine, which upon oral or intravenous administration to e.g. mice, cats or rabbits in doses from about 0.1 g/kg to about 0.5 g/kg produce outstanding sedative and hypnotic effects. Thus, they show ataxia in mice as determined by the rota-rod method, inhibit the poly- and mono-synaptic reflex in the anaesthetised cat and afford protection against electrically or metrazole-induced convulsions.

The new compounds are manufactured by methods in themselves known. Thus, they are obtained by converting in a 6-X-4-oxo-4,5-dihydro-isothiazolo[5,4-d]pyrimidine, in which X is a group capable of being converted into an amino group, X into an amino group.

A group X convertible into an amino group is, for example, a residue exchangeable for an amino group, above all a reactive esterified hydroxyl group, such as a hydroxyl group esterified with a strong inorganic or organic acid, preferably a hydrohalic, e.g. hydrochloric, hydrobromic or hydroiodic acid (i.e. representing a halogen, e.g. chlorine, bromine or iodine atom), as well as a sulfuric acid or a hydroxyl group esterified with a strong organic sulfonic acid, such as a strong aromatic sulphonic, e.g. benzenesulfonic, 4-bromo-benzenesulphonic or 4-toluene sulfonic acid. The group X also represents a free or etherified mercapto group, such as a lower alkyl-mercapto, e.g. methylmercapto, or an aryl-lower alkyl-mercapto, e.g. benzylmercapto group, furthermore a suitable etherified hydroxyl group, such as a lower alkoxy, e.g. methoxy or ethoxy, or an aryl-lower alkoxy, e.g. benzyloxy group, an ammonium group, such as a tri-lower alkyl-ammonium, e.g. trimethylammonium group, a sulfonyl group, particularly a lower alkyl-sulfonyl, e.g. methyl-sulfonyl group, or a cyano group.

The conversion of the above starting materials into the desired compounds is carried out by treatment with ammonia or an ammonia-furnishing reagent, or with a primary or secondary amine, if desired, with an excess thereof, usually at an elevated temperature.

The new compounds are also obtained by ring-closing a 5-amino-($Z_1$)methyleneamino-4-Y-isothiazole, in which Y is a reactive functionally converted carboxyl group, which together with the group $Z_1$ furnishes the ring-amide grouping upon ring-closure, or a tautomer thereof, and, if necessary, converting in a resulting compound, in which the 4-position contains a residue capable of being converted into the oxo group and differing from the latter, such residue into the oxo group.

A reactive functionally converted carboxyl group Y is primarily an esterified carboxyl group, above all a carbo-lower alkoxy, such as a carbomethoxy or carboethoxy group; it may also represent a cyano group. A reactive functionally converted carboxyl group Y may also be an optionally N-monosubstituted carbamoyl, as well as thiocarbamoyl group.

Depending up on the nature of the functionally converted carboxyl group Y, the group $Z_1$ is a nitrogen - containing or nitrogen - free grouping. The latter is, for example, a free or etherified hydroxy or mercapto group, such as a lower alkoxy, e.g. methoxy, or a lower alkyl-mercapto, e.g. methylmercapto group; upon ring-closure, such group forms together with an optionally N-monosubstituted carbamoyl or thiocarbamoyl group Y the desired ring-amide grouping. A nitrogen-containing group $Z_1$ is e.g. an optionally substituted amino group, which upon ring-closure with the reactive functionally converted carboxyl group Y, particularly an esterified carboxyl group, as well as a cyano group, furnishes the desired ring-amide grouping.

Usually, the ring-closure is carried out at elevated temperatures, if necessary, in the presence of a suitable condensing reagent. In a resulting compound, in which the 4-position contains a substituent capable of being converted into the oxo group, such group is converted into the oxo group according to known methods, preferably by hydrolysis, an imino group, for example, by treatment with an aqueous acid, such as dilute aqueous hydrochloric or sulfuric acid, a thiono group, for example, by treatment with an alkali metal hydroxide in the presence of a suitable oxidation reagent, such as hydrogen peroxide.

The new compounds may also be prepared by ring-closing a 4-amino-($Z_2$ methylaminocarbonyl-5-amino-isothiazole compound or a tautomer thereof, in which $Z_2$ represents a grouping capable of being split-off together with hydrogen.

A group $Z_2$ is, for example, an amino group, as well as a free or preferably a reactive etherified hydroxy or mercapto group, such as a lower alkoxy or lower alkyl-mercapto, e.g. methoxy or methylmercapto group, Such group is being split-off together with hydrogen, for example, in the form of ammonia, water, or an alcohol or mercaptan.

The ring-closure is usually performed at an elevated temperature, if necessary, in the presence of a suitable condensing reagent.

The afore-mentioned reactions are performed in the usual manner, preferably in the presence of a solvent and/or diluent, if necessary, in the presence of catalysts or condensing agents, under increased pressure and/or in the atmosphere of an inert gas, e.g. nitrogen.

In resulting compounds, substituents may, within the meaning of the definitions, be converted into each other, introduced or cleaved off. Thus, in compounds, in which the 5-position is unsubstituted, the hydrogen atom may be replaced by a suitable organic residue, for example, by treating the free compound or a salt, such as a metal, particularly an alkali metal, e.g. sodium or potassium salt with a reactive ester of a suitable organic hydroxy compound, particularly a corresponding halide, e.g. chloride or bromide, or a corresponding sulfonyloxy, e.g. p-toluenesulfonyloxy compound, a suitable basic condensation reagent being preferably present, when the free compound is being used.

Depending on the reaction condition, the new compounds are obtained in free form or in the form of their salts, particularly acid addition salts; salts are likewise included in the present invention.

Resulting salts can be converted in a known manner into other salts or into the corresponding free compounds, for example, by treatment with bases, such as alkali hydroxides, or suitable ion-exchange resins. Acid addition salts, which may also be used as intermediates, for example, in the purification of the free compounds, for example, by converting a free compound into a salt thereof, isolating the latter and liberating the free compound from the isolated salt or for identification purposes (for example, the picrates), are primarily pharmaceutically acceptable, non-toxic acid addition salts, such as those with inorganic acids, e.g. hydrochloric, hydrobromic, sulfuric, phosphoric, nitric or perchloric acid, or with organic acids, such as aliphatic, cycloaliphatic, cycloaliphatic-aliphatic, aromatic, araliphatic, heterocyclic or heterocyclic-aliphatic carboxylic or sulfonic acids, e.g. formic, acetic, propionic, succinic, glycollic, lactic, malic, tartaric, citric, ascorbic, maleic, hydroxymaleic, pyruvic, phenylacetic, benzoic, 4-aminobenzoic, anthranilic, 4-hydroxybenzoic, salicylic, 4-amino-salicylic, embonic, methanesulfonic, ethanesulfonic, 2-hydroxyethanesulfonic, ethylenesulfonic, halogenobenzenesulfonic, toluenesulfonic, naphthalenesulfonic, sulfanilic or N-cyclohexylsulfamic acid. Salts with acids, such as those mentioned above, are obtained, by usual methods, for example, by treatment of the free compound with an acid or with a suitable ion exchange preparation.

In view of the close relationship between the new compounds in free form and in the form of their salts, whenever the free compounds or the salts are mentioned above or hereinafter, the corresponding salts and free compounds, respectively, are, whenever applicable and suitable, likewise concerned.

The invention further includes any modification of the procedure, in which an intermediate product resulting at any stage of the process is used as the starting material and any remaining steps are carried out, or the process is discontinued at any stage, or in which a starting material is formed under the reaction conditions or is used in the form of a derivative, such as a salt thereof. The invention also includes any resulting new intermediate compounds.

Advantageously one uses starting materials, which lead to the preferred compounds previously mentioned.

The present invention also includes new starting materials, as well as their manufacture, particularly the 6-$X_o$-4-oxo-4,5-dihydro-isothiazolo[5,4-d]pyrimidine compounds, such as the compounds of the formula

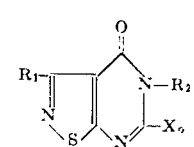

(II)

in which $R_1$ and $R_2$ have the above given meaning, and $X_o$ stands for halogeno, particularly chloro, as well as bromo; these compounds are obtained by reacting 6-hydroxy-4-oxo-4,5-dihydro-isothiazolo[5,4-d]pyrimidine compounds or corresponding tautomers thereof, particularly those of the formula

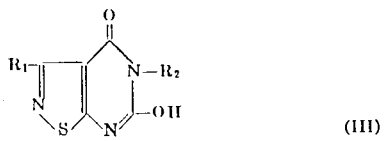

or tautomers thereof, with halogenating reagents capable of converting a hydroxy group into a halogen atom, such as phosphorus halides or oxyhalides, e.g. phosphorus pentachloride or phosphorus oxychloride. In a 4,6-dihalogeno-isothiazolo [5,4-d]pyrimidine compound, which is unsubstituted in 5-position and which may be obtained as an intermediate, such as a compound of the formula

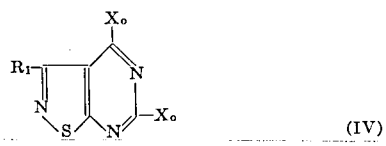

the halogen atom in 4-position may be selectively hydrolized to the hydroxyl group by treatment with a suitable base, such as an aqueous alkali metal hydroxide, such as sodium hydroxide. In case other esterifying reagents are used, the hydroxy group in 6-position can be converted into another reactive esterified hydroxy group, for example, into a hydroxy group esterified by a strong organic sulfonic acid.

The above starting materials, in which X stands for a reactive esterified hydroxyl group, e.g. a halogen atom, may be converted according to per se known methods into other starting materials, in which X is different from such group, for example, into an etherified hydroxy or mercapto group, an ammonium group, a sulfonyl group or a cyano group by treatment with an alkali metal compound of an alcohol or a mercaptan, a tert.-amine, an alkali metal salt of sulfinic acid and an alkali metal cyanide, respectively. Mercapto starting materials may also be obtained from the above dioxo compounds, for example, by treatment with a sulfur-introducing reagent, e.g. phosphorus pentasulfide; they may be etherified, for example, by treatment, if desired, of alkali metal salts thereof, with reactive esters of alcohols, the free compounds usually in the presence of basic reagents, such as alkali metal hydroxides. By oxidation of a mercapto compound with a suitable oxidation reagent, e.g. hydrogen peroxide, a peracid, chromic acid or potassium permanganate, the corresponding sulfonyl compounds may be formed.

5-Amino-($Z_1$)methyleneamino-4-Y-isothiazole starting materials, in which Y represents a reactive functionally converted carboxyl group, particularly an esterified carboxyl group, and in which $Z_1$ stands for an optionally substituted amino group, and which may also be formed in situ without being isolated, are obtained, for example, by reacting a 4-Y-5-amino-isothiazole, in which the amino group is unsubstituted, with an isothiourea, in which the sulfur atom is optionally substituted, or a tautomer thereof or a salt of such compound. In the isothiourea reagent, a substituted mercapto group is primarily an etherified mercapto group, such as a lower alkylmercapto, especially methylmercapto group. Salts of the isothiourea reagent, which may also be used in the form of the corresponding thiourea compound in case the mercapto group is unsubstituted, are above all those with strong mineral, particularly hydrohalic or sulfuric acids.

4-Amino-($Z_2$)methylaminocarbonyl-5-amino-isothiazole starting materials, in which $Z_2$ is, for example, an amino group, are prepared by treatment e.g. of a 5-amino-4-isothiazole-carboxylic acid ester with a guanidine, preferably in the presence of a condensing reagent, such as an alkali metal lower alkanoate; the starting material may ring-close and furnish the final product without being isolated.

The new compounds may be used as medicaments, for example, in the form of pharmaceutical preparations, which contain them in the free form or in the form of their salts in admixture or conjunction with an organic or inorganic, solid or liquid pharmaceutical excipient suitable for enteral, e.g. oral or parenteral administration. Excipients are primarily substances which do not react with the new compounds, for example, water, sugars, e.g. lactose, fructose, glusose or saccharose, starches, e.g. corn starch, wheat starch, rice starch or arrowroot, stearyl alcohol, stearic acid or salts thereof, such as salcium stearate or magnesium stearate, talcum, vegetable oils, benzyl alcohols, gums, propyleneglycol, polyethyleneglycols or any other known medicinal excipients. The pharmaceutical preparations may be in solid form, e.g. as tablets, dragees, capsules or suppositories, or in liquid form, e.g. as solutions, suspensions or emulsions. They may be sterilized and/or may contain auxiliary substances, such as preservatives, stabilizers, wetting agents or emulsifiers, solubilizers, salts for regulating the osmotic pressure or buffers. They may also contain other therapeutically valuable substances. The pharmaceutical preparations are formulated according to usual methods.

The new compounds may also be used in the form of animal feed or of animal feed additives, using, for example, the conventional extending or diluting agents and feed, respectively.

The following Examples illustrate the invention; temperatures are given in degrees centigrade. If not otherwise stated the specific amount of starting material used is the amount obtained according to the preparation of the starting material.

EXAMPLE 1

A mixture of the 6-chloro-3,5-dimethyl-4-oxo-4,5-dihydro-isothiazolo[5,4-d]pyrimidine, prepared as described below, and of 3 g of triethylamine and 2.5 g of morpholine in 30 ml of toluene is refluxed for 3 hours and then evaporated to dryness. The residue is treated with ice-water and extracted with ethyl acetate. The organic layer is dried over anhydrous sodium sulphate and evaporated, and the residue is chromatographed on 50 g of neutral aluminum oxide. The chloroform eluate is evaporated and the residue is crystallized from a mixture of ethyl acetate and hexane to yield the 3,5-dimethyl-6-(4-morpholino)-4-oxo-4,5-dihydro-isothiazolo[5,4-d]pyrimidine of the formula

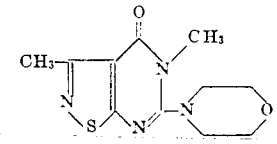

m.p. 129°–130°.

The starting material is prepared as follows:

A mixture of 4.5 g of 3,5-dimethyl-4,6-dioxo-4,5,6,7-tetrahydro-isothiazolo[5,4-d]pyrimidine, 25 ml of phosphorous oxychloride and 2.5 ml of N,N-dimethylaniline is refluxed on an oil-bath for 5 hours. The excess of phosphorous oxychloride is then removed by distillation under reduced pressure; the residue is taken up in 10 ml of toluene, and the solvent is again removed under reduced pressure. The residue is treated with 100 ml ice-water; the 6-chloro-3,5-dimethyl-4-oxo-4,5-dihydro-isothiazolo[5,4-d]pyrimidine is extracted with methylene chloride; the organic layer is dried over anhydrous sodium sulfate and evaporated.

EXAMPLE 2

A mixture of the 6-chloro-3,5-dimethyl-4-oxo-4,5-dihydro-isothiazolo[5,4-d]pyrimidine, as prepared according to the procedure described in Example 1, in 30 ml of toluene, containing 3 g of triethylamine and 3 g of octahydro-azocine is refluxed for 3 hours, and is then evaporated to dryness under reduced pressure. The residue is treated with ice-water and extracted with ethyl acetate. The organic layer is dried over anhydrous sodium sulfate and evaporated; the residue is chromatographed on 50 g of neutral aluminum oxide. The chloroform eluate is evaporated and the product is crystallized from a mixture of ethyl acetate and hexane to yield the 3,5-dimethyl-6-octahydroazocinyl-4-oxo-4,5-dihydro-isothiazolo[5,4-d]pyrimidine of the formula

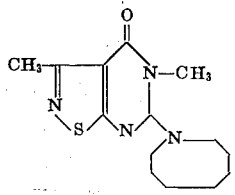

m.p. 95°–97°.

EXAMPLE 3

A mixture of the 6-chloro-3,5-dimethyl-4-oxo-4,5-dihydro-isothiazolo[5,4-d]pyrimidine, as prepared according to the procedure described in Example 1, in 30 ml of toluene, containing 3 g of triethylamine and 3 g of 2,5-dimethyl-pyrrolidine is refluxed for 3 hours, and is then evaporated to dryness under reduced pressure. The residue is treated with ice-water and extracted with ethyl acetate; the organic layer is dried over anhydrous sodium sulfate and evaporated, and the residue is chromatographed on 50 g of neutral aluminum oxide. The chloroform eluate is evaporated and the residue is crystallized from hexane to yield the 3,5-dimethyl-6-(2,5-dimethyl-pyrrolidino)-4-oxo-4,5-dihydro-isothiazolo[5,4-d]pyrimidine of the formula

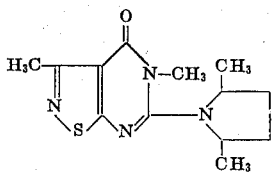

m.p. 109°–110°.

EXAMPLE 4

A mixture of the 6-chloro-3,5-dimethyl-4-oxo-4,5-dihydro-isothiazolo[5,4-]pyrimidine as prepared according to the procedure described in Example 1 in 30 ml of toluene, containing 3 g of triethylamine and 3.1 g of 2,6-dimethyl-morpholine is refluxed for 3 hours, and is then evaporated to dryness under reduced pressure. The residue is treated with ice-water and extracted with ethyl acetate; the organic layer is dried over anhydrous sodium sulfate and evaporated, and the residue is chromatographed on 50 g of neutral aluminum oxide. The chloroform eluate is evaporated and the residue is crystallized from a mixture of ether and hexane to yield the 3,5-dimethyl-6-(2,6-dimethyl-4-morpholino)-4-oxo-4,5-dihydro-isothiazolo[5,4-d]pyrimidine of the formula

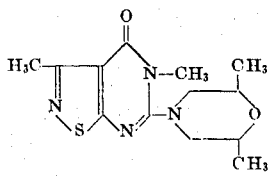

m.p. 144°–146°.

EXAMPLE 5

A mixture of the 6-chloro-3,5-dimethyl-4-oxo-4,5-dihydro-isothiazolo[5,4-d]pyrimidine as prepared according to the procedure described in Example 1 in 30 ml of toluene, containing 3 g of triethylamine and 3.2 g of 1-(2-hydroxy-ethyl)-piperazine is refluxed for 3 hours, and is then evaporated to dryness under reduced pressure. The residue is treated with ice-water and extracted several times with ethyl acetate; the combined organic extract is dried over anhydrous sodium sulfate and evaporated. The residue is triturated with a mixture of ethanol and ether to yield a solid material, which is recrystallized from a mixture of ethyl acetate and ether to afford the 3,5-dimethyl-6-[4-(2-hydroxyethyl)-1-pi-perazino]-4-oxo-4,5-dihydro-isothiazolo[5,4-d]pyrimidine of the formula

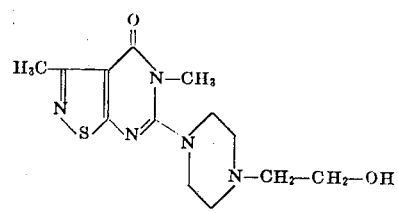

m.p. 143°–145°.

EXAMPLE 6

A mixture of the 6-chloro-3,5-dimethyl-4-oxo-4,5-dihydro-isothiazolo[5,4-]pyrimidine as prepared according to the procedure described in Example 1 in 30 ml of toluene, containing 3 g of triethylamine and 2.5 g of piperidine is refluxed for 3 hours and then evaporated to dryness under reduced pressure. The residue is treated with ice-water and extracted repeatedly with ether. The combined ether extract is washed with water, dried over anhydrous sodium sulfate, and the solvent is removed. The residue is chromatographed on 50 g of neutral aluminum oxide, the chloroform eluate is evaporated, and the residue is crystallized from hexane to yield the 3,5-dimethyl-6-piperidino-4-oxo-4,5-dihydro-isothiazolo[5,4-d]pyrimidine of the formula

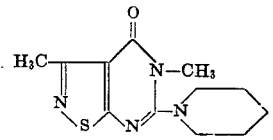

m.p. 133°–135°. The free base is transformed into its hydrochloride by addition of an ethanolic solution of HCl and the hydrochloride is recrystallized from ethanol/ether, m.p. 183°–185°.

EXAMPLE 7

A mixture of the 6-chloro-3,5-dimethyl-4-oxo-4,5-dihydro-isothiazolo[5,4-d]pyrimidine as prepared according to the procedure described in Example 1 in 30 ml of toluene, containing 3 g of triethylamine and 3 g of 1-methyl-piperazine is refluxed for 3 hours, and is then evaporated to dryness under reduced pressure. The residue is treated with ice-water and extracted with ethyl acetate; the organic layer is dried over anhydrous sodium sulfate and evaporated. The residue is chromatographed on 50 g of neutral aluminum oxide, and the eluate with a 1:1-mixture of chloroform and ethyl acetate is evaporated. The residue is crystallized from a mixture of ethyl acetate and hexane to yield the 3,5-dimethyl-6-(4-methyl-1-piperazino)-4-oxo-4,5-dihydro-isothiazolo[5,4-d]pyrimidine of the formula

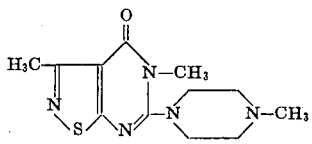

m.p. 141°–142°.

EXAMPLE 8

A mixture of the 6-chloro-5-ethyl-3-methyl-4-oxo-4,5-dihydro-isothiazolo[5,4-]pyrimidine, prepared as described below in 30 ml of toluene, containing 2 g of triethylamine and 2 g of morpholine is refluxed for 3 hours and then evaporated to dryness. The residue is treated with ice-water and extracted with ethyl acetate; the organic layer is dried over anhydrous sodium sulfate and evaporated. The residue is chromatographed on 50 g of neutral aluminum oxide; the chloroform eluate is evaporated and the residue is crystallized from a mixture of ethyl acetate and hexane to yield the 5-ethyl-3-methyl-6-(4-morpholino)-4-oxo-4,5-dihydro-isothiazolo[5,4-d]pyrimidine of the formula

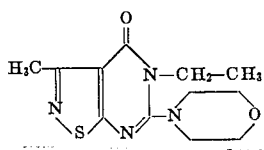

m.p. 125°–127°.

The starting material used above is prepared as follows:

A mixture of 9.5 g of 4-carbethoxy-5-N-carbophenyloxyamino-3-methyl-isothiazole and 50 ml of a 40 percent ethanolic solution of ethylamine is refluxed for 2 hours and then evaporated to dryness under reduced pressure. The residue is triturated with hexane, filtered off and recrystallized from aqueous ethanol to yield the 4-carbethoxy-5-N-(N-ethyl-carbamoyl)-amino-3-methyl-isothiazole, m.p. 173°–175°.

A solution of 1 g of sodium in 35 ml of ethanol is treated with 8 g of 4-carbethoxy-5-N-(N-ethyl-carbamoyl)- -N-(N-ethyl-carbamoyl)-amino- 3-methyl-isothiazole and refluxed for 3 hours. The solvent is then removed under reduced pressure, the residue is dissolved in water and the solution is acidified. The solid material is filtered off, washed with water and crystallized from aqueous ethanol to yield the 4,6-dioxo-5-ethyl-3-methyl-4,5,6,7-tetrahydro-isothiazolo[5,4-d]pyrimidine, m.p. 182°–184°.

A mixture of 4 g of 4,6-dioxo-5-ethyl-3-methyl-4,5,6,7-tetrahydro-isothiazolo[5,4-d]pyrimidine, 25 ml of phosphorous oxychloride and 2.5 ml of N,N-dimethylaniline is refluxed on an oil-bath for 5 hours. The excess of phosphorous oxychloride is then removed by distillation under reduced pressure; 10 ml of toluene are added to the residue and the mixture is again taken to dryness. The residue is treated with 100 ml of ice-water; the resulting 6-chloro-5-ethyl-3-methyl-4-oxo-4,5-dihydro-isothiazolo[5,4-d]pyrimidine is extracted with methylene chloride, and the solution is dried over anhydrous sodium sulfate and evaporated.

EXAMPLE 9

A mixture of 5-n-butyl-6-chloro-3-methyl-4-oxo-4,5-dihydro-isothiazolo[5,4-d]pyrimidine, prepared as shown below, in 40 ml of toluene, containing 2,2 g of triethylamine and 2.1 g of morpholine is refluxed for 3 hours and then evaporated to dryness. The residue is treated with ice-water and extracted with ethyl acetate; the organic layer is dried over anhydrous sodium sulfate and evaporated. The residue is chromatographed on 50 g of neutral aluminum oxide; the chloroform eluate is evaporated and the residue is crystallized from a mixture of ethyl acetate and hexane to afford the 5-n-butyl-3-methyl-6-(4-morpholino)-4-oxo-4,5-dihydro-isothiazolo[5,4-d]pyrimidine of the formula

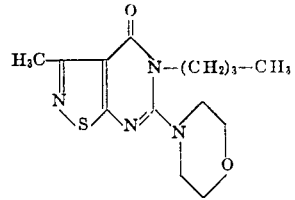

m.p. 98°–100°.

The starting material used above is prepared as follows:

A solution of 9 g of 4-carbethoxy-5-N-carbophenyloxyamino-3-methyl-isothiazole in 25 ml of ethanol is refluxed with 3.5 g of n-butylamine for 2 hours and then evaporated to dryness under reduced pressure. The residue is triturated with hexane, filtered off and recrystallized from aqueous ethanol to give the 5-N-(N-n-butyl-carbamoyl)-amino-4-carbethoxy-3-methyl-isothiazole, m.p. 152°–154°.

A solution of 1 g of sodium in 35 ml of ethanol is treated with 7 g of 5-N-(N-n-butyl-carbamoyl)-amino-4-carbethoxy-3-methyl-isothiazole and refluxed for 3 hours. The solvent is then removed under reduced pressure, the residue is dissolved in water and the solution is acidified. The solid is filtered off, washed with water and crystallized from aqueous ethanol to yield the 5-n-butyl-4,6-dioxo-3-methyl-4,5,6,7-tetrahydro-isothiazolo[5,4-d]pyrimidine, m.p. 128°–130°.

A mixture of 4 g of 5-n-butyl-4,6-dioxo-3-methyl-4,5,6,7-tetrahydro-isothiazolo[5,4-d]pyrimidine, 25 ml of phosphorous oxychloride and 2.5 ml of N,N-dimethylaniline is refluxed on an oil-bath for 5 hours. The excess of phosphorous oxychloride is then removed by distillation under reduced pressure, 10 ml of toluene are added to the residue and the mixture is again taken to dryness. 100 ml of ice-water are added to the residue, and the 5-n-butyl-6-chloro-3-methyl-4-oxo-4,5-dihydro-isothiazolo[5,4-d]pyrimidine is extracted with methylene chloride, the solution is dried over anhydrous sodium sulfate and evaporated.

EXAMPLE 10

A mixture of 6-chloro-3-methyl-5-(2-methyl-phenyl)-4-oxo-4,5-dihydro-isothiazolo[5,4-d]pyrimidine, prepared as shown below, and 15 ml of morpholine is refluxed for 3 hours, and then evaporated to dryness. The residue is treated with water and extracted with ethyl acetate; the organic layer is dried over anhydrous sodium sulfate and evaporated. The residue is chromatographed on 25 g of neutral aluminum oxide; the chloroform eluate is evaporated and the residue is crystallized from ethanol to yield the 3-methyl-5-(2-methyl-phenyl)-6-(4-morpholino)-4-oxo-4,5-dihydro-isothiazolo[5,4-d]pyrimidine of the formula

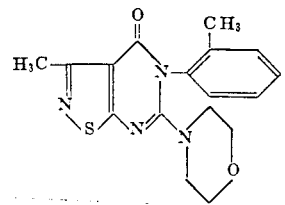

m.p. 190°–192°.

The starting material used in the above procedure is prepared as follows:

A mixture of 18 g of 4-carbethoxy-5-N-carbophenyl-oxy-amino-3-methyl-isothiazole and 6 g of o-toluidine is heated at 150° for 4 hours. After cooling, the solid material is triturated with dilute aqueous acetic acid and filtered off. The product is recrystallized from aqueous acetic acid to give the 4-carbethoxy-3-methyl-5-N-[N-(2-methyl-phenyl)-carbamoyl)]-amino-isothiazole, m.p. 180°–182°.

A mixture of 16 g of 4-carbethoxy-3-methyl-5-N-[N-(2-methyl-phenyl)-carbomoyl]-amino-isothiazole and 160 ml of 4N aqueous sodium hydroxide is heated until the solid material has dissolved; heating is continued for another 5 minutes, then cooled and acidified. The solid material is filtered off, washed with water and crystallized from ethanol to afford the 4,6-dioxo-3-methyl-5-(2-methyl-phenyl)-4,5,6,7-tetrahydro-isothiazolo[5,4-d]pyrimidine, m.p. 263°–265°.

A mixture of 4.5 g of 4,6-dioxo-3-methyl-5-(2-methyl-phenyl)-4,5,6,7-tetrahydro-isothiazolo[5,4-d]pyrimidine, 25 ml of phosphorous oxychloride and 4 ml of N,N-dimethylaniline is refluxed on an oil-bath for 5 hours. The excess of phosphorous oxychloride is then removed by distillation under reduced pressure, 10 ml of toluene are added to the residue and the mixture is again taken to dryness and treated with 100 ml of ice-water. The 6-chloro-3-methyl-5-(2-methyl-phenyl)-4-oxo-4,5-dihydro-isothiazolo[5,4-d]pyrimidine is extracted with methylene chloride, the solution is dried over anhydrous sodium sulfate and evaporated.

EXAMPLE 11

A mixture of the 6-chloro-3-methyl-5-(2-methyl-phenyl)-4-oxo-4,5-dihydro-isothiazolo[5,4-d]pyrimidine, prepared as described in Example 10, and 20 ml of a 33 percent ethanolic solution of dimethylamine is refluxed for 3 hours and then evaporated to dryness. The residue is treated with water and extracted with ethyl acetate. The organic layer is dried over anhydrous sodium sulfate and evaporated. The residue is chromatographed on 25 g of neutral aluminum oxide. The chloroform eluate is evaporated and the residue is crystallized from ethanol to afford 6-dimethylamine-3-methyl-5-(2-methyl-phenyl)-4-oxo-4,5-dihydro-isothiazolo[5,4-d]pyrimidine of the formula

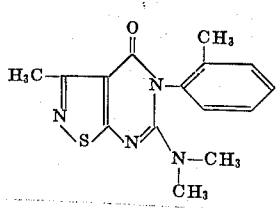

m.p. 216°–217°.

EXAMPLE 12

The mixture of 6-chloro-3-methyl-4-oxo-5-(3-trifluoromethyl-phenyl)-4,5-dihydro-isothiazolo[5,4-d]pyrimidine, prepared as described below, and 30 ml of toluene, containing 1.5 g of triethylamine and 1.2 g of morpholine is refluxed for 3 hours and then evaporated to dryness. The residue is treated with ice-water and extracted with ethyl acetate. The organic layer is dried over anhydrous sodium sulfate and evaporated. The residue is chromatographed on 25 g of neutral aluminum oxide. The chloroform eluate is evaporated and the residue is crystallized from a mixture of ethyl acetate and hexane to yield the 3-methyl-6-(4-morpholino)-4-oxo-5-(3-tri-fluoromethyl-phenyl)-4,5-dihydro-isothiazolo[5,4-d]pyrimidine of the formula

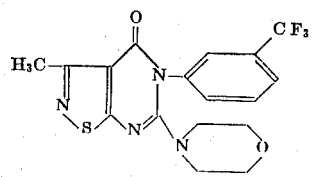

m.p. 194°–196°.

The starting material used in the above procedure is prepared as follows:

A mixture of 4.5 g of 4-carbethoxy-5-N-carbophenyl-oxy-amino-3-methyl-isothiazole and 2.4 g of 3-trifluoromethyl-aniline is heated at 150° for 4 hours, then cooled and triturated with dilute aqueous acetic acid. The solid material is filtered off and recrystallized from aqueous ethanol to yield the 4-carbethoxy-3-methyl-5-N-[N-(3-trifluoromethyl-phenyl)-carbamoyl]-amino-isothiazole, m.p. 207°–210°.

A solution of 1 g of sodium in 40 ml of ethanol is treated with 10 g of 4-carbethoxy-3-methyl-5-N-[N-(3-trifluoromethyl-phenyl)-carbamoyl]-amino-isothiazole and refluxed for 3 hours. The solvent is then removed under reduced pressure, the residue is dissolved in water, the solution is acidified and the mixture filtered and the filter residue is recrystallized from aqueous ethanol to yield the 4,6-dioxo-3-methyl-5-(3-trifluoromethyl-phenyl)-4,5,6,7-tetrahydro-iso-thiazolo[5,4-d]pyrimidine, m.p. 141°–146°.

A mixture of 2.5 g of 4,6-dioxo-3-methyl-5-(3trifluoromethyl-phenyl)-4,5,6,7-tetrahydro-isothiazolo[5,4-d]pyrimidine, 10 ml of phosphorous oxychloride and 1.5 ml of N,N-dimethylaniline is refluxed on an oil-bath for 5 hours. The excess of phosphorous oxychloride is then removed by distillation under reduced pressure, 10 ml of toluene are added to the residue and the mixture is again taken to dryness. The residue is treated with 100 ml of ice-water, the 6-chloro-3-methyl-4-oxo-5-(3-trifluoromethyl-phenyl)-4,5-dihydro-isothiazolo[5,4-d]pyrimidine is extracted with methylene chloride, the solution is dried over anhydrous sodium sulfate and evaporated.

EXAMPLE 13

A mixture of the 6-chloro-3-ethyl-5-methyl-4-oxo-4,5-dihydro-isothiazolo[5,4-d]pyrimidine, prepared as shown below, 3.0 g of triethylamine and 2.5 g of morpholine in 30 ml of toluene is refluxed for 3 hours and then evaporated to dryness. The residue is treated with ice-water and extracted with ethyl acetate. The organic layer is dried over anhydrous sodium sulfate and evaporated. The residue is chromatographed on 50 g of neutral aluminum oxide. The chloroform eluate is evaporated and the residue is crystallized from a mixture of ethyl acetate and hexane to yield the 3-ethyl-5-methyl-6-(4-morpholino)-4-oxo-4,5-dihydro-isothiazolo[5,4-d]pyrimidine of the formula

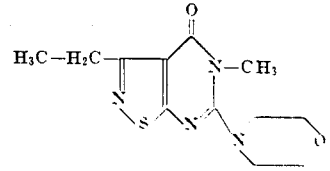

m.p. 120°–121°.

The starting material used in the above procedure is prepared as follows:

A stirred mixture of 26 g of potassium thiocyanate and 75 ml of dry acetonitrile, maintained at 10°–15°, is treated dropwise with 43 g of phenyl chloroformate in the course of 15 minutes. After an additional 5 minutes, a solution of 36 g of 3-amino-2-pentenoic acid ethyl ester in 50 ml of acetonitrile is added dropwise; the internal temperature is maintained at 10°–15. After the addition is completed, the mixture is stirred at 15° for an additional 15 minutes and at room temperature for 30 minutes. The solution is then poured on 750 ml of water and stirred for 4 hours. The product is extracted with ether, the ether solution is washed with water, dried and evaporated. The residue is crystallized from a mixture of benzene and hexane to yield the N-(3-amino-2-carbethoxy-2-pententhioyl)-N-carbophenyloxy-amine, m.p. 116°.

A suspension of 40 g of N-(3-amino-2-carbethoxy-2-pententhioyl)-N-carbophenyloxy-amine in 80 ml of ethyl acetate is cooled to 10° and, while stirring, treated dropwise with a solution of 15 ml of bromine in 60 ml of ethyl acetate. The addition of bromine is stopped, when a slight excess of bromine is indicated by starch-potassium iodide paper. An excess of ether is then added to the solution; the precipitate is filtered off, dissolved in ethanol and diluted with ice-water. The precipitate is filtered off and crystallized from hexane to yield the 4-carbethoxy-5-N-carbophenyloxy-amino-3-ethyl-isothiazole, m.p. 81°–83°.

A solution of 10 g of 4-carbethoxy-5-N-carbophenyl-oxy-amino-3-ethyl-isothiazole in 50 ml of ethanol is refluxed for 3 hours with 50 ml of a 33 percent ethanolic solution of methylamine. The solvent is removed under reduced pressure, the residue is triturated with ice-water, filtered and recrystallized from aqueous ethanol to yield the 4-carbethoxy-3-ethyl-5-N-(N-methylcarbamoyl)-amino-isothiazole, m.p. 181°–183°.

A mixture of 9 g of 4-carbethoxy-3-ethyl-5-N-(N-methyl-carbamoyl)-amino-isothiazole and 90 ml of 4N aqueous sodium hydroxide is heated until the solid material has been dissolved; heating is continued for another 5 minutes. After cooling and acidifying, the solid material is filtered off, washed with water and recrystallized from aqueous ethanol to yield the 4,6-dioxo-3-ethyl-5-methyl-4,5,6,7-tetrahydro-isothiazolo[5,4-d]pyrimidine, m.p. 216°–218°.

A mixture of 4.5 g of 4,6-dioxo-3-ethyl-5-methyl-4,5,6,7-tetrahydro-isothiazolo[5,4-d]pyrimidine, 25 ml of phosphorous oxychloride and 2.5 ml of N,N-dimethylaniline is refluxed on an oil-bath for 5 hours. The excess of phosphorous oxychloride is then removed by distillation under reduced pressure, 10 ml of toluene are added to the residue and the solvent is again removed under reduced pressure. The residue is treated with 100 ml of ice-water. The 6-chloro-3-ethyl-5-methyl-4-oxo-4,5-dihydro-isothiazolo[5,4-d]pyrimidine is extracted with methylene chloride, the organic layer is dried over anhydrous sodium sulfate and evaporated.

EXAMPLE 14

A mixture of the 6-chloro-3-ethyl-5-(2-phenylethyl)-4-oxo-4,5-dihydro-isoxazolo[5,4-d]pyrimidine, prepared as described below, and 40 ml of toluene, containing 2 g of triethylamine and 1.5 g of morpholine of refluxed for 3 hours. The solvent is then removed under reduced pressure; the residue is treated with ice-water and extracted with ethyl acetate. The organic layer is dried over anhydrous sodium sulfate and evaporated. The residue is chromatographed on 25 g of neutral aluminum oxide. The chloroform eluate is evaporated and the residue is crystallized from a mixture of ethyl acetate and hexane to yield the 3-ethyl-5-(2-phenylethyl)-6-(4-morpholino)-4-oxo-4,5-dihydro-isothiazolo[5,4-d]pyrimidine of the formula

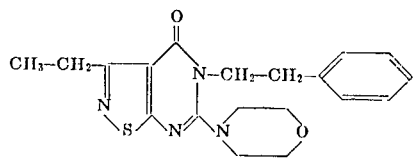

m.p. 114°–115°.

The starting material used in the above procedure is prepared as follows:

A solution of 4.8 g of 4-carbethoxy-3-ethyl-5-N-carbophenyloxy-amino-isothiazole (prepared as shown in Example 13) in 25 ml of ethanol is treated with 2 g of 2-phenylethylamine and refluxed for 1 hour. The solvent is then removed under reduced pressure and the residue is crystallized from a mixture of ethyl acetate and hexane to give the 4-carbethoxy-3-ethyl-5-N-[N-(2-phenylethyl)-carbamoyl]-amino-isothiazole, m.p. 159°–161°.

A solution of 0.5 g of sodium in 35 ml of methanol is treated with 4.5 g of 4-carbethoxy-3-ethyl-5-N-[N-(2-phenylethyl)-carbomoyl]-amino-isothiazole; the solution is refluxed for 3 hours, the solvent is then removed under reduced pressure and the residue is treated with water. The insoluble material is filtered off, and the filtrate is acidified. The solid material is filtered off, washed and crystallized from aqueous ethanol to yield the 4,6-dioxo-3-ethyl-5-(2-phenyl-ethyl)-4,5,6,7-tetrahydro-isothiazolo[5,4-d]pyrimidine, m.p. 185°–118°.

A mixture of 4 g of 4,6-dioxo-3-ethyl-5-(2-phenyl-ethyl)-4,5,6,7-tetrahydro-isothiazolo[5,4-d]pyrimidine, 15 ml of phosphorous oxychloride and 2 ml of dimethylaniline is refluxed on an oil bath for 5 hours. The excess of phosphorous oxychloride is then removed by distillation under reduced pressure. 10 ml of toluene are then added to the residue and the solvent is again distilled off under reduced pressure. The residue is treated with ice-water, and the 6-chloro-3-ethyl-5-(2-phenylethyl)-4-oxo-4,5-dihydro-isothiazolo[5,4-d]pyrimidine is extracted with methylene chloride; the organic layer is dried over anhydrous sodium sulfate and evaporated.

EXAMPLE 15

A mixture of the 6-chloro-5-methyl-3-n-propyl-4-oxo-4,5-dihydro-isothiazolo[5,4-d]pyrimidine, prepared as described below, and 50 ml of toluene, containing 5 ml of triethylamine and 4.5 ml of morpholine is refluxed for 3 hours. The solvent is then removed under reduced pressure, the residue is treated with ice-water and extracted with ethyl acetate. The organic layer is dried over anhydrous sodium sulfate and evaporated. The residue is chromatographed on 50 g of neutral aluminum oxide, the chloroform eluate is evaporated, and the residue is crystallized from hexane to yield the 5-methyl-6-(4-morpholino)-4-oxo-3-n-propyl-4,5-dihydro-isothiazolo[5,4-d]pyrimidine of the formula

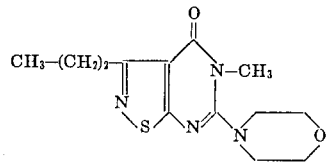

m.p. 103°–105°.

The starting material used in the above procedure is prepared as follows:

A stirred mixture of 13.8 of potassium thiocyanate and 60 ml of dry acetonitrile, maintained at 10°–15°, is treated dropwise with 2.6 g of phenyl chloroformate in the course of 15 minutes. After a further 5 minutes, a solution of 20.9 g of 3-amino-2-hexenoic acid ethyl ester in 40ml of acetonitrile is added dropwise; the internal temperature is maintained at 10°–15. After the addition is completed, stirring at 15° is continued for an additional 15 minutes, then at room temperature for 30 minutes. The solution is poured into 500 ml of water and stirred for one hour. The reaction mixture is extracted with ether, the ether extract is washed with water, dried over anhydrous sodium sulfate and the solvent is removed. The residue is triturated with a mixture of ether and hexane, and filtered to give N-(3-amino-2-carbethoxy-2-hexenthioyl)-N-carbophenyloxy-amine, m.p. 113°–115°, after crystallization from a mixture of benzene and hexane.

A suspension of 35 g of N-(3-amino-2-carbethoxy-2-hexenthioyl)-N-carbophenyloxy-amine in 80 ml of ethyl acetate is cooled to 10°, and, while stirring, treated dropwise with a solution of 12 ml of bromine in 25 ml of ethyl acetate. The addition of bromine is stopped, when the presence of a slight excess of bromine is detected with starch-potassium iodide paper. An excess of ether is added to the solution to obtain an oily product, which is dissolved in 25 ml of ethanol; the solution is diluted with 250 ml of ice-water. The organic material is extracted with ether, the ether extract is washed with water, dried over anhydrous sodium sulfate and evaporated. The residual oil, representing the 4-carbethoxy-5-N-carbophenyloxy-amino-3-n-propyl-isothiazole, is used in the next step without further purification.

A solution of 20 g of the crude oily 4-carbethoxy-5-N-carbophenyloxy-amino-3-n-propyl-isothiazole in 50 ml of ethanol is treated with 35 ml of a 33 percent ethanolic solution of methylamine. The solution is refluxed for 3 hours, then evaporated to dryness under reduced pressure. The residue is triturated with water, filtered and recrystallized from aqueous ethanol to yield the 4-carbethoxy-5-N-(N-methyl-carbamoyl)-amino-3-n-propyl-isothiazole, m.p. 171°–173°.

A mixture of the above 4-carbethoxy-5-N-(N-methylcarbamoyl)-amino-3-n-propyl-isothiazole and 140 ml of 4N aqueous sodium hydroxide is heated until the solid material has dissolved; the heating is continued for an additional 5 minutes. After cooling and acidifying, the solid material is filtered off, washed with water and recrystallized from aqueous ethanol to give the 4,6-dioxo-5-methyl-3-n-propyl-4,5,6,7-tetrahydro-isothiazolo[5,4-d]pyrimidine, m.p. 141°–143°.

A mixture of 8 g of 4,6-dioxo-5-methyl-3-n-propyl-4,5,6,7-tetrahydro-isothiazolo[5,4-d]pyrimidine, 40 ml of phosphorous oxychloride and 4 ml of N,N-dimethylaniline is refluxed on an oil-bath for 5 hours. The excess of phosphorous oxychloride is then removed by distillation under reduced pressure, 15 ml of toluene are added to the residue, and the solvent is again removed under reduced pressure. The residue is treated with 100 ml of ice-water; the 6-chloro-5-methyl-3-n-propyl-4-oxo-4,5-dihydro-isothiazolo[5,4-d]pyrimidine is extracted with methylene chloride. The organic layer is dried over anhydrous sodium sulfate and evaporated.

EXAMPLE 16

A mixture of the 6-chloro-3-isopropyl-5-methyl-4-oxo-4,5-dihydro-isothiazolo[5,4-d]pyrimidine, prepared as shown below, and 15 ml of toluene, containing 1.6 g of triethylamine and 1.5 g morpholine is refluxed for 3 hours. The solvent is then removed under reduced pressure, ice-water is added to the cold residue and the organic material is extracted with ethyl acetate. The organic layer is dried over anhydrous sodium sulfate and evaporated. The residue is chromatographed on 25 g of neutral aluminum oxide. The chloroform eluate is evaporated and the residue is crystallized from a mixture of ether and hexane to yield the 3-isopropyl-5-methyl-6-(4-morpholino)-4-oxo-4,5-dihydro-isothiazolo[5,4-d]pyrimidine of the formula

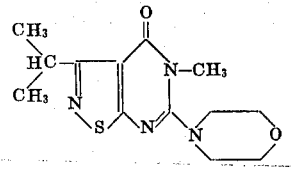

m.p. 133°–135°.

The starting material used in the above procedure is prepared as follows:

A stirred mixture of 6.9 g of potassium thiocyanate and 20 ml of dry acetonitrile, maintained at 10°–15°, is added dropwise 11.3 g of phenyl chloroformate in the course of 15 minutes. After a further 5 minutes, a solution of 10.5 g of 3-amino-4-methyl-2-pentenoic acid ethyl ester in 15 ml acetonitrile is added dropwise; the internal temperature is maintained at 10°–15°. After the addition is complete, stirring at 15° is continued for an additional 15 minutes, then at room temperature for 30 minutes. The solutions is poured into 300 ml of water and stirred for one hour. The organic material is extracted with ether, the ether extract is dried and evaporated, and the residue is crystallized from a mixture of benzene and hexane to yield the N-(3-amino-2-carbethoxy-4-methyl-2-pententhioyl)-N-carbophenyloxy-amine, m.p. 105°–107°.

A mixture of 13 g of N-(3-amino-2-carbethoxy-4-methyl-2-pententhioyl)-N-carbophenyloxy-amine and 25 ml of ethyl acetate is stirred and cooled to 10°. A solution of 4.5 ml of bromine in 10 ml of ethyl acetate is added dropwise until a slight excess of bromine is detected. An excess of ether is then added; the oily hydrobromide salt is isolated by decanting the solvents. The residue is dissolved in ethanol, the solution is diluted with ice-water and the base is extracted with ether. The ether extract is washed with water, dried over anhydrous sodium sulfate and evaporated. The oily 4-carbethoxy-5-N-carbophenyloxy-amino-3-isopropyl-isothiazole is used in the next step without further purification.

A solution of the above 4-carbethoxy-5-N-carbophenyl-oxy-amino-3-isopropyl-isothiazole in 12 ml of ethanol is treated with 9 ml of a 33 percent ethanolic methylamine solution, and the mixture is refluxed for 3 hours. The solvent is then removed under reduced pressure, the residue is triturated with ice-water, filtered off, and crystallized from aqueous ethanol to yield the 4-carbethoxy-3-isopropyl-5-N-(N-methyl-carbamoyl)-amino-isothiazole, m.p. 208°–210°.

A mixture of 4 g of 4-carbethoxy-3-isopropyl-5-N-(N-methylcarbamoyl)-amino-isothiazole and 40 ml of 4N aqueous sodium hydroxide is heated until the solid material is dissolved; heating is continued for a further 5 minutes. After cooling and acidifying, the solid material is filtered off, washed with water, and recrystallized from aqueous ethanol to yield the 4,6-dioxo-3-isopropyl-5-methyl-4,5,6,7-tetrahydro-isothiazolo[5,4-d]pyrimidine, m.p. 188°–191°.

A mixture of 2.5 g of 4,6-dioxo-3-isopropyl-5-methyl-4,5,6,7-tetrahydro-isothiazolo[5,4-d]pyrimidine, 12.5 ml of phosphorous oxychloride and 1.25 ml of N,N-dimethylaniline is refluxed on an oil-bath for 5 hours. The excess of phosphorous oxychloride is then removed by distillation under reduced pressure, 5 ml of toluene are added to the residue and the solvent is again distilled off under reduced pressure. The residue is treated with 25 ml of ice-water; the 6-chloro-3-isopropyl-5-methyl-4-oxo-4,5-dihydro-isothiazolo[5,4-d]pyrimidine is extracted with methylene chloride, the organic layer is dried over anhydrous sodium sulfate and evaporated.

EXAMPLE 17

The 3-n-butyl-6-chloro-5-methyl-4-oxo-4,5-dihydroisothiazolo[5,4-d]pyrimidine, prepared as shown below, is dissolved in 150 ml of toluene and treated with 10 ml of triethylamine and 8 ml of morpholine. The mixture is refluxed for 3 hours; the solvent is removed under reduced pressure and ice-water is added to the cold residue. The organic material is extracted with ethyl acetate; the organic ayer is dried over anhydrous sodium sulfate and evaporated. The residue is chromatographed on 100 g of neutralaluminum oxide, the benzene eluate is evaporated, and the residue is crystallized from hexane to yield the 3-n-butyl-5-methyl-6-(4-morpholino)-4-oxo-4,5-dihydro-isothiazolo[5,4-d]pyrimidine of the formula

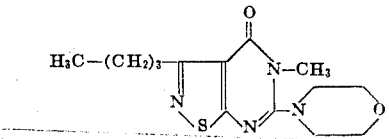

m.p. 84°–86°.

The starting material used in the above procedure is prepared as follows:

To a stirred mixture of 34 g of potassium thiocyanate and 85 ml of dry acetonitrile, maintained at 10°–15°, is added dropwise 60 g of phenyl chloroformate in the course of 15 minutes. After an additional 5 minutes, a solution of 52 g of 3-amino-2-heptenoic acid ethyl ester in 60 ml of acetonitrile is added dropwise; the internal temperature is maintained at 10°–15°. After the addition is complete, stirring at 15° is continued for a further 15 minutes, then at room temperature for 30 minutes. The solution is poured into 1,000 ml of water and stirred for 1 hour; the solid is filtered, triturated with a mixture of ether and hexane and filtered off to yield the N-(3-amino-2-carbethoxy-2-heptenthioyl)-N-carbophenyloxyamine, m.p. 115°–116°.

A suspension of 48 g of N-(3-amino-2-carbethoxy-2-heptenthioyl)-n-carbophenyloxy-amine in 90 ml of ethyl acetate is cooled to 10°, and, while stirring, treated dropwise with 20 ml of bromine in 40 ml of ethyl acetate. The addition of bromine is stopped, when the presence of a slight excess of bromine can be detected with a starch-potassium iodide paper. A total of 400 ml of ether is added to the solution, and the hydrobromide salt is filtered off, dissolved in 50 ml of ethanol and diluted with 500 ml of ice-water. The precipitate is filtered off and crystallized from hexane to yield the 3-n-butyl-4-carbethoxy-5-N-carbophenyloxy-amino-isothiazole, m.p. 64°–65°.

A sOlution of 34 g of 3-n-butyl-4-carbethoxy-5-N-carbophenyloxy-amino-isothiazole is treated with 100 ml of a 33 percent ethanolic solution of methylamine. The mixture is refluxed for 3 hours, then evaporated under reduced pressure and diluted with 300 ml of ice-water. The solid material is filtered off and recrystallized from aqueous ethanol to afford 3-n-butyl-4-carbethoxy-5-N-(N-methyl-carbamoyl)-amino-isothiazole, m.p. 171°–175°.

A mixture of 27 g of 3-n-butyl-4-carbethoxy-5-N-(N-methyl-carbamoyl)-amino-isothiazole and 250 ml of 4N aqueous sodium hydroxide is heated until the solid is dissolved; heating is continued for an additional 5 minutes. After cooling and acidifying, the solid material is filtered off, washed with water and recrystallized from aqueous ethanol to yield the 3-n-butyl-4,6-dioxo-5-methyl-4,5,6,7-tetrahydro-isothiazolo[5,4-d]pyrimidine, m.p. 156-158°.

A mixture of 16.5 g of 3-n-butyl-4,6-dioxo-5-methyl-4,5,6,7-tetrahydro-isothiazolo[5,4-d]pyrimidine, 80 ml of phosphorous oxychloride and 8 ml of N,N-dimethylaniline is refluxed on an oil-bath for 5 hours. The excess of phosphorous oxychloride is then removed by distillation under reduced pressure, 25 ml of toluene are added to the residue, and the solvent is again removed under reduced pressure. The residue is treated with 200 ml of ice-water, The 3-n-butyl-6-chloro-5-methyl-4-oxo-4,5-dihydro-isothiazolo[5,4-d]pyrimidine is extracted with methylene chloride, the organic layer is dried over anhydrous sodium sulfate and evaporated.

EXAMPLE 18

A mixture of 2.9 g of 3-n-butyl-6-chloro-5-methyl-4-oxo-4,5-dihydro-isothiazolo[4,5-d]pyrimidine, 2.5 ml of triethylamine and 2 g of thiamorpholine in 50 ml toluene is refluxed for 3 hours and then evaporated under reduced pressure. The residue is treated with ice-water and extracted with ethyl acetate. The organic layer is dried over anhydrous sodium sulfate and evaporated. The residue is chromatographed on 25 g of neutral aluminum oxide, the benzene eluate is evaporated, and the residue is crystallized from hexane to give the 3-n-butyl-5-methyl-6-(4-thiamorpholino)-4-oxo-4,5-dihydroisothiazolo[5,4-d]pyrimidine of the formula

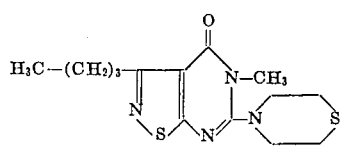

m.p. 95°–96°.

EXAMPLE 19

A solution of the 6-chloro-3-isobutyl-5-methyl-4-oxo-4,5-dihydro-isothiazolo[5,4-d]pyrimidine, prepared as described below, in 10 ml of toluene is treated with 0.5 g of triethylamine and 0.5 g of morpholine. The mixture is refluxed for 3 hours, the solvent is then removed under reduced pressure and ice-water is added to the cold residue. The organic material is extracted with ethyl acetate; the organic layer is dried over anhydrous sodium sulfate and evaporated. The residue is chromatographed on 10 g of neutral aluminum oxide; the benzene eluate is evaporated and the residue is crystallized from hexane to yield the 3-isobutyl-5-methyl-6-(4-morpholino)-4-oxo-4,5-dihydro-isothiazolo[5,4-d]pyrimidine of the formula

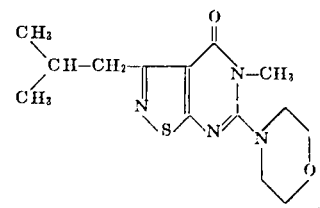

m.p. 110°–111°.

The starting material used in the above procedure is prepared as follows:

A stirred mixture of 3 g of potassium thiocyanate and 10 ml of dry acetonitrile, maintained at 10°–15°, is treated dropwise with 6 g of phenyl chloroformate in the course of 10 minutes. After a further 5 minutes, a solution of 5.6 g of 3-amino-5-methyl-2-hexenoic acid ethyl ester in 10 ml of acetonitrile is added dropwise, the internal temperature being maintained below 15°. Stirring is continued for 30 minutes at 15°, then another hour at room temperature. The mixture is poured into water and stirred vigorously for 30 minutes. The organic material is extracted with ether, the ether extract is washed with water, dried over anhydrous sodium sulfate and the solvent removed. The residue is triturated with a mixture of ether and hexane and filtered to yield the N-(3-amino-2-carbethoxy-5-methyl-2-hexenthioyl)-N-carbophenyloxy-amine, m.p. 105°–110°.

A stirred suspension of 4 g of N-(3-amino-2-carbethoxy-5-methyl-2-hexenthioyl)-N-carbophenyloxy-amine in 10 ml of ethyl acetate at 10° is treated dropwise with a solution of 3 ml of bromine in 7 ml of ethyl acetate, until the starch-potassium iodide paper indicates the presence of a slight excess of bromine. After stirring for another 10 minutes, an excess of dry ether is added. The precipitated oily hydrobromide salt is dissolved in 10 ml of ethanol and diluted with ice-water. The free base is extracted with water, the ether layer is washed with water, dried and evaporated. The oily residue is boiled with hexane and the insoluble material is filtered off. The filtrate is evaporated to dryness and the residual oily 4-carbethoxy-5-N-tarbophenyloxy-amino-3-isobutyl-isothiazole is used in the next step without further purification.

A solution of 3 g of the crude oily 4-carbethoxy-5-carbophenyloxy-amino-3-isobutyl-isothiazole in 10 ml of ethanol is treated with 20 ml of a 33 percent ethanolic methylamine solution. The solution is refluxed on a water-bath for 3 hours, and then evaporated to dryness under reduced pressure. The residue is triturated with ice water and filtered; the solid material is recrystallized from aqueous ethanol to yield the 4-carbethoxy-3-isobutyl-5-N-(N-methyl-carbamoyl)-amino-isothiazole, m.p. 181°–183°.

A mixture of 2 g of 4-carbethoxy-3-isobutyl-5-N-(N-methyl-carbamoyl)-amino-isothiazole and 20 ml of 4N aqueous sodium hydroxide is heated until the solid material is completely dissolved; heating is continued for another 5 minutes. After cooling and acidifying with hydrochloric acid, the solid material is filtered off, washed with water and crystallized from aqueous ethanol to yield the 4,6-dioxo-3-isobutyl-5-methyl-4,5,6,7-tetrahydro-isothiazolo[5,4-d]pyrimidine, m.p. 142°–144°.

A mixture of 1.1 g of 4,6-dioxo-3-isobutyl-5-methyl-4,5,6,7-tetrahydro-isothiazolo[5,4-d]pyrimidine, 5 ml of phosphorous oxychloride and 0.5 ml of N,N-dimethylaniline is refluxed on an oil-bath for 5 hours. The excess of phosphorous oxychloride is then removed under reduced pressure, 10 ml of toluene are added to the residue and the solvents are again evaporated under reduced pressure. The residue is treated with ice-water and the 6-chloro-3-isobutyl-5-methyl-4-oxo-4,5-dihydro-isothiazolo[5,4d]pyrimidine is extracted with methylene chloride. The organic layer is dried over anhydrous sodium sulfate and evaporated.

EXAMPLE 20

A mixture of 6-chloro-5-methyl-4-oxo-3-n-pentyl- 4,5-dihydro-isothiazolo[5,4d]pyrimidine, prepared as shown below, 3 g of triethylamine and 2.5 g of morpholine in 50 ml of toluene is refluxed for 3 hours. The solvent is then removed under reduced pressure, the residue is treated with ice-water and extracted and extracted with ethyl acetate. The organic layer is dried over anhydrous sodium sulfate and evaporated. The residue is chromatographed on 25 g of neutral aluminum oxide, the benzene eluate is evaporated, and the residue is crystallized from hexane to give the 5-methyl-6-(4-morpholino)-4-oxo-3-n-pentyl-4,5-dihydro-isothiazolo[5,4-d]pyrimidine of the formula

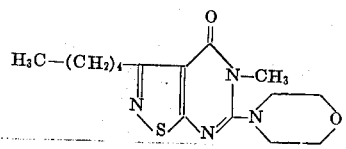

m.p. 68°–79°.

The starting material used in the above procedure is prepared as follows:

A stirred mixture of 12.2 g of potassium thiocyanate and 40 ml of dry acetonitrile, maintained at 10°–15°, is treated dropwise with 20.2 g of phenyl chloroformate in the course of 15 minutes. After a further 5 minutes, a solution of 21.4 g of 3-amino-2-octenoic acid ethyl ester in 30 ml of acetonitrile is added dropwise; the internal temperature is maintained at 10°–15. After the addition is complete, stirring at 15° is continued for a further 15 minutes, then at room temperature for 30 minutes. The solution is poured into 500 ml of water and stirred for 1 hour. The product is extracted with ether, the solution is washed with water, and dried over anhydrous sodium sulfate, and the solvent is evaporated. The residue is triturated with a mixture of ether and hexane and filtered to yield the N-(3-amino-2-carbethoxy-2-octenthioyl)-N-carbophenyloxy-amine, m.p. 101°–105°.

A suspension of 25.5 g of N-(3-amino-2-carbethoxy-2-octenthioyl)-N-carbophenyloxy-amine in 150 ml of ethyl acetate is cooled to 10°, and, while stirring, treated dropwise with a solution of 7 ml of bromine in 20 ml of ethyl acetate. The addition of bromine is stopped, when a starch potassium-iodide paper indicates the presence of a slight excess of bromine. An excess of ether is then added, and the precipitated hydrobromide salt is filtered off, dissolved in ethanol and diluted with ice-water. The free base is extracted with ether, the ether layer is washed with water, dried and evaporated. The oily residue is boiled with hexane and the insoluble material is filtered off. The filtrate is evaporated to dryness and the residual oily 4-carbethoxy-5-N-carbophenyloxy-amino-3-n-pentyl-isothiazole is used without further purification in the next step.

A solution of 14 g of the crude oily 4-carbethoxy-5-N-carbophenyloxy-amino-3-n-pentyl-isothiazole in 50 ml of ethanol is treated with 35 ml of a 33 percent ethanolic methylamine solution. The solution is refluxed for 2 hours, and then evaporated to dryness under reduced pressure. The residue is triturated with ice-water and filtered. The solid material is recrystallized from aqueous ethanol to yield the 4-carbethoxy-5-N-(N-methylcarbamoyl)-amino-3-n-pentyl-isothiazole, m.p. 164°–166°.

A mixture of 12 g of 4-carbethoxy-5-N-(N-methyl-carbamoyl)-amino-3-n-pentyl-isothiazole and 200 ml of 4 N aqueous sodium hydroxide is heated until the solid material is completely dissolved; heating is continued for another 5 minutes, cooled thouroughly and acidified with hydrochloric acid. The solid material is filtered, washed with water and crystallized from aqueous ethanol to afford the 4,6-dioxo-5-methyl-3-n-pentyl-4,5,6,7-tetrahydro-isothiazolo[5,4 d]pyrimidine, m.p. 128°–130°.

A mixture of 5.5 g of 4,6-dioxo-5-methyl-3-n-pentyl-4,5,6,7-tetrahydro-isothiazolo[5,4-d]pyrimidine, 25 ml of phosphorous oxychloride and 2.5 ml of N,N-dimethylaniline is refluxed for 5 hours, at the end of which the excess phosphorous oxychloride is removed under reduced pressure; 25 ml of dry toluene are added to the residue and the solvents are again distilled off under reduced pressure. The residue is treated with ice-water and the 6-chloro-5-methyl-4-oxo-3-n-pentyl-4,5-dihydro-isothiazolo[5,4-d]pyrimidine is extracted with methylene chloride; the organic layer is dried over anhydrous sodium sulfate and evaporated.

EXAMPLE 21

A solution of the 6-chloro-3-n-heptyl-5-methyl-4-oxo-4,5-dihydro-isothiazolo[5,4-d]pyrimidine prepared as shown below, in 50 ml of toluene is treated with 3 ml of triethylamine and 2.5 ml of morpholine. The mixture is refluxed for 3 hours, the solvent is then removed under reduced pressure, and ice-water is added to the cold residue. The product is extracted with ethyl acetate; the organic layer is dried over anhydrous sodium sulfate and evaporated. The residue is chromatographed on 40 g of neutral aluminum oxide, the benzene eluate is evaporated, and the residue is crystallized from hexane to yield the 3-n-heptyl-5-methyl-6-(4-morpholino)- 4-oxo-4,5-dihydro-isothiazolo[5,4-d]pyrimidine of the formula

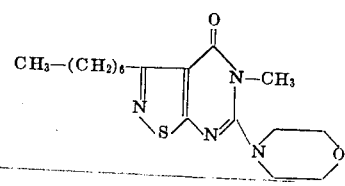

m.p. 68°–70°.

The starting material used in the above procedure is prepared as follows:

A stirred mixture of 11 g of potassium thiocyanate and 40 ml of dry acetonitrile, maintained at 10°–15°, is treated dropwise with 17.1 g of phenyl chloroformate in the course of 15 minutes. After a further 5 minutes, a solution of 21.3 g of 3-amino-2-decenoic acid ethyl ester in 30 ml of acetonitrile is added dropwise; the internal temperature is maintained at 10°–15. After the addition is completed stirring at 15° is continued for a further 15 minutes, then at room temperature for 30 minutes. The solution is poured into 500 ml of water and stirred for one hour. The product is extracted with ether, washed with water, dried over anhydrous sodium sulfate and the solvent is partially removed. After the addition of hexane, the N-(3-amino-2-carbethoxy-2-decenthiyol)-N-carbophenyloxy-amine, m.p. 96°–97°, is filtered off.

A suspension of 16.5 g of N-(3-amino-2-carbethoxy-2-decenthioyl)-N-carbophenyloxy-amine in 50 ml of ethyl acetate is cooled to 10°, and, while stirring, is treated dropwise with a solution of 10 g of bromine in 15 ml of ethyl acetate. The addition of bromine is stopped, when the starch-potassium iodide paper indicates the presence of a slight excess of bromide. An excess of ether is added to the solution and the hydrobromide salt is filtered off, and dissolved in ethanol and the solution is diluted with ice-water. The free base is filtered off and recrystallized from hexane to yield the 4-carbethoxy-5-N-carbophenyloxy-amino-3-n-heptyl-isothiazole. m.p. 53°–54.

A solution of 8.5 g of 4-carbethoxy-5-N-carbophenyloxy-amino-3-n-heptyl-isothiazole in 50 ml of ethanol is refluxed for 3 hours with 40 ml of a 33 percent ethanolic solution of methylamine. The solvent is then evaporated under reduced pressure, ice-water is added to the residue and the solid material is filtered off and crystallized from aqueous ethanol to give the 4-carbethoxy-5-N-(N-methyl-carbamoyl)-amino-3-n-heptyl-isothiazole, F. 150°.

A mixture of 9 g of 4-carbethoxy-5-N-(N-methyl-carbamoyl)-amino-3-n-heptyl-isothiazole and 100 ml of 4N aqueous sodium hydroxide is heated until the solid material is dissolved; heating is continued for an additional 5 minutes, cooled and acidified. The solid material is filtered off, washed with water, and recrystallized from aqueous ethanol to afford 4,6-dioxo-3-n-heptyl-5-methyl-4,5,6,7-tetrahydroisothiazolo[,4-d]pyrimidine, m.p. 130°.

A mixture of 4.5 g of 4,6-dioxo-3-n-heptyl-5-methyl-4,5,6,7-tetrahydro-isothiazolo[5,4-d]pyrimidine, 25 ml of phosphorous oxychloride and 2.5 ml of N,N-dimethylaniline is refluxed for 5 hours. The excess of phosphorous oxychloride is then removed by distillation under reduced pressure, 20 ml of toluene are added to the residue and the solvent is again removed under reduced pressure. The residue is treated with ice-water and the 6-chloro-3-n-heptyl-5-methyl-4-oxo-4,5-dihydro-isothiazolo[5,4-d]pyrimidine is extracted with methylene chloride, the organic layer is dried over anhydrous sodium sulfate and evaporated.

EXAMPLE 22

A mixture of the 6-chloro-3-n-hexyl-5-methyl-4-oxo-4,5-dihydro-isothiazolo[5,4-d]pyrimidine prepared as described below, and 9 g of triethylamine and 8 g of morpholine in 200 ml of toluene is refluxed for 3 hours and then evaporated to dryness. The residue is treated with ice-water and extracted with ethyl acetate. The organic layer is dried over anhydrous sodium sulfate and evaporated. The residue is chromatographed on 200 g aluminum oxide; the benzene eluate is evaporated, the resulting oily residue is triturated with hexane and cooled in an ice bath. The resulting solid material is filtered and recrystallized to yield the 3-n-hexyl-5-methyl-6-(4-morpholino)-4-oxo-4,5-dihydro-isothiazolo[5,4-d]pyrimidine of the formula

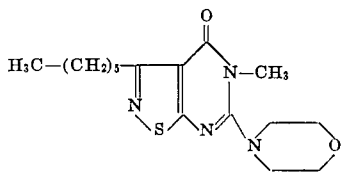

m.p. 57°-59°.

The starting material used in the above procedure is prepared as follows:

A stirred mixture of 13 g of potassium thiocyanate and 50 ml of dry acetonitrile, maintained at 10°-15°, is treated dropwise with 22 g of phenyl chloroformate in the course of 15 minutes. After a further 5 minutes, a solution of 25 g of 3-amino-2-nonenoic acid ethyl ester in 40 ml of acetonitrile is added dropwise; the internal temperature is maintained between 10°-15°. After the addition is complete, stirring at 15° is continued for 15 minutes, then at room temperature for 12 hours. The solution is poured into 500 ml of water and stirred for 1 hour. The product is extracted with ether, the ether extract is dried and evaporated. The residue is crystallized from a mixture of ether and hexane to yield the N-(3-amino-2-carbethoxy-2-nonenthioyl)-N-carbophenyloxy-amine, m.p. 105°-107°.

A mixture of 23 g of N-(3-amino-2-carbethoxy-2-nonenthioyl)-N-carbophenyloxy-amine and 60 ml of ethyl acetate is stirred and cooled to 10°. A solution of 7 ml of bromine in 25 ml of ethyl acetate is added dropwise, until a slight excess of bromine remains. An excess of ether is added, and the oily hydrobromide salt is isolated by decantating the solvent and dissolved in ethanol. The solution is diluted with water and the base is extracted with ether; the ether extract is washed with water, dried over anhydrous sodium sulfate and evaporated to give an oily product, which is boiled with 100 ml of hexane, filtered and cooled to yield the 4-carbethoxy-5-N-carbophenyloxy-amino-3-n-hexyl-isothiazole, m.p. 50°-52°.

A mixture of 27 g of 4-carbethoxy-5N-carbophenyl-oxy-amino-3-n-hexyl-isothiazole in 50 ml of ethanol is treated with 100 ml of a 33 percent ethanolic solution of methylamine and refluxed for 3 hours. The solvent is removed under reduced pressure, the residue is triturated with ice-water, filtered off and crystallized from aqueous ethanol to yield the 4-carbethoxy-5-N-(N-methyl-carbamoyl)-amino-3-n-hexyl-isothiazole, m.p. 147°-149°.

A mixture of 30 g of 4-carbethoxy-5-N-(N-methyl-carbamoyl)-amino-3-n-hexyl-isothiazole and 400 ml of 4N aqueous sodium hydroxide is heated until the solid material is dissolved; heating is continued for an additional 5 minutes. After cooling and acidifying, the solid material is filtered off, washed with water and recrystallized from aqueous ethanol to yield the 4,6-dioxo-3-n-hexyl-5-methyl-4,5,6,7-tetrahydro-isothiazolo[5,4-d]pyrimidine, m.p. 127°-129°.

A mixture of 16 g of 4,6-dioxo-3-n-hexyl-5-methyl-4,5,6,7-tetrahydro-isothiazolo[5,4-d]pyrimidine, 80 ml of phosphorous oxychloride and 8 ml of N,N-dimethylaniline is refluxed on an oil-bath for 5 hours. The excess of phosphorous oxychloride is removed by distillation under reduced pressure, toluene is added and the solvent is again removed under reduced pressure. The residue is treated with 200 ml of ice-cold water, the oily 6-chloro-3-n-hexyl-5-methyl-4-oxo-4,5-dihydro-isothiazolo[5,4-d]pyrimidine is extracted with methylene chloride, the organic layer is dried over anhydrous sodium sulfate and evaporated.

EXAMPLE 23

A mixture of the 6-chloro-3-cyclopentylmethyl-5-methyl-4-oxo-4,5-dihydro-isothiazolo[5,4-d]pyrimidine, prepared as shown below, and 50 ml of toluene, containing 3 ml of triethylamine and 3 ml of morpholine is refluxed for 3 hours. The solvent is removed under reduced pressure, ice-water is added to the cold residue and the product is extracted with ethyl acetate. The organic layer is dried over anhydrous sodium sulfate and evaporated. The residue is chromatographed on 100 g of aluminum oxide. The benzene eluate is evaporated, the residue is cooled and triturated with hexane; the resulting solid material is filtered off and crystallized from hexane to yield the 3-cyclopentylmethyl-5-methyl-6-(4-morphdino)-4-oxo-4,5-dihydro-isothizaolo[5,4-d]pyrimidine of the formula

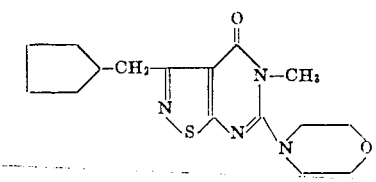

m.p. 107°-109°.

The starting material used in the above procedure is prepared as follows:

A stirred mixture of 8 g of potassium thiocyanate and 30 ml of dry acetonitrile, maintaining a temperature of 10°-15°, is treated dropwise with 13.5 g of phenyl chloroformate in the course of 15 minutes. After a further 5 minutes, a solution of 13 g of 3-amino-4-cyclopentyl-crotonic acid ethyl ester in 25 ml of acetonitrile is added dropwise; the internal temperature is maintained at 10°-15°. After the addition is complete, stirring is continued for 30 minutes at 15°, then during 30 minutes at room temperature. The solution is then poured in to 300 ml of water, stirred for 1 hour, and extracted with ethyl acetate. The ethyl acetate layer is dried over anhydrous sodium sulfate and evaporated. The residue is recrystallized from a mixture of benzene and hexane to yield the N-(3-amino-2-carbethoxy- 4-cyclopentyl-thiocrotonyl)-N-carbophenyloxy-amine, m.p. 136°–138°.

A mixture of 18 g of N-(3-amino-2-carbethoxy-4-cyclopentyl-thiocrotonyl)-N-carbophenyloxy-amine and 125 ml ethyl acetate is cooled to 10°. A solution of 6 ml of bromine in 25 ml of ethyl acetate is added dropwise, until there remains a slight excess of bromine. The resulting solid material is filtered off after adding an excess of ether. The solid hydrobromide salt is dissolved in 20 ml of ethanol, an excess of water is added and the resulting oil is extracted with ether. The ether extract is dried over anhydrous sodium sulfate, filtered and evaporated. The oily 4-carbethoxy-5-N-carbophenyloxy-amino-3-cyclopentylmethyl-isothiazole is used in the next step without further purification.

A solution of the 4-carbethoxy-5-N-carbophenyloxy-amino-3-cyclopentylmethyl-isothiazole as obtained in the previous step in 50 ml of ethanol and 100 ml of a 33 percent ethanolic methylamine solution is refluxed for 3 hours, the ethanol is removed under reduced pressure and the residue is diluted with ice-cold water. The solid material is filtered off and crystallized from aqueous ethanol to yield the 4-carbethoxy-3-cyclopentylmethyl-5-N-(N-methyl-carbamoyl)-amino-isothiazole, m.p. 193°–195°.

A mixture of 8.5 g of 4-carbethoxy-3-cyclopentylmethyl-5-N-(N-methyl-carbamoyl)-amino-isothiazole is treated with 1 g of sodium, dissolved in 50 ml of ethanol and is then refluxed for 2 hours, the ethanol is removed under reduced pressure, 100 ml of ice-cold water is added, to the residue, the mixture is carefully acidified until the pH is just acidic and filtered. The filter residue is crystallized from a mixture of ethyl acetate and hexane to yield the 3-cyclopentyl-methyl-4,6-dioxo-5-methyl-4,5,6,7-tetrahydro-isothiazolo[5,4-d]pyrimidine, m.p. 151°–153°.

A mixture of 6.5 g of 3-cyclopentyl-methyl-4,6-dioxo-5-methyl-4,5,6,7-tetrahydro-isothiazolo[5,4-d]pyrimidine, 36 ml of phosphorous oxychloride and 3 ml of N,N-dimethylaniline is refluxed on an oil-bath for 5 hours. The excess of phosphorous oxychloride is then removed by distillation under reduced pressure, 15 ml of toluene are added to the residue and the solvent is again distilled off under reduced pressure. The residue is treated with ice-water, and the 6-chloro-3-cyclopentylmethyl-5-methyl-4-oxo-4,5-dihydro-isothiazolo[5,4-d]pyrimidine is extracted with methylene chloride; the organic layer dried over anhydrous sodium sulfate and evaporated.

EXAMPLE 24

A mixture of the 3-n-butyl-6-chloro-4-oxo-4,5-dihydro-isothiazol[5,4-d]pyrimidine, prepared as shown below, and 25 ml of toluene, containing 1 ml of triethylamine and 1.5 g of morpholine is refluxed for 3 hours. The solvent is removed under reduced pressure, ice-cold water is added and the mixture is extracted with methylene chloride, the organic layer is dried over anhydrous sodium sulfate, filtered and evaporated to give a solid material, which is crystallized from ethanol to yield the 3-n-butyl-6-(4-morpholino)-4-oxo-4,5-dihydro-isothiazolo[5,4-d]pyrimidine of the formula

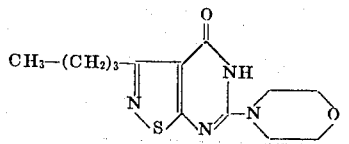

m.p. 223°–225°.

The starting material used in the above procedure is prepared as follows:

A solution of 10 g of 3-n-butyl-4-carbethoxy-5-N-carbophenyloxy-amino-isothiazole is refluxed during 2 hours with 200 ml of an ethanolic ammonia solution, then cooled, diluted with water and filtered. The filter residue is crystallized from ethanol to yield the 3-n-butyl-4-carbethoxy-5-N-carbamoyl-amino-isothiazole, m.p. 272°–275°.

A mixture of 15 g of the 3-n-butyl-4-carbethoxy-5-N-carbamoyl-amino-isothiazole and 250 ml of 2N aqueous sodium hydroxide is heated until the solid material is dissolved; heating is continued for an additional 5 minutes. After cooling and acidifying, the solid material is filtered off, washed with water, and recrystallized from ethanol to afford the 3-n-butyl-4,6-dioxo-4,5,6,7-tetrahydroisothiazolo[5,4-d]pyrimidine, m.p. 280°–282°.

The above 3-n-butyl-4,6-dioxo-4,5,6,7-tetrahydro-isothiazolo[5,4-d]pyrimidine is refluxed for 5 hours with 25 ml of phosphorous oxychloride and 3 ml of N,N-dimethylaniline. The excess of phosphorous oxychloride is removed under reduced pressure, the residue is treated with 15 ml of toluene and the solvent is again evaporated. The residue is extracted with methylene chloride; the organic layer is washed twice with cold water and dried over anhydrous sodium sulfate, filtered and evaporated to give the 3-n-butyl-4,6-dichloro-isothiazolo[5,4-d]pyrimidine as an oily product, which is used in the next step without further purification.

A mixture of 5 g of the 3-n-butyl-4,6-dichloro-isothiazolo[5,4-d]pyrimidine, 125 ml of 1N aqueous sodium hydroxide and 40 ml of tetrahydrofuran is stirred at room temperature for 4 hours. The solution is chilled and adjusted to pH 5 with acetic acid. The yellow solid is filtered off and crystallized from ethyl acetate and hexane to yield the 3-n-butyl-6-chloro-4-oxo-4,5-dihydro-isothiazolo[5,4-d]pyrimidine m.p. 163°–165°.

EXAMPLE 25

A mixture of 3.3 g of the chloro compound 6-chloro-3,5-dimethyl-4-oxo-4,5-dihydro-isothiazolo[5,4-d]pyrimidine prepared as in Example of 1, 2.5 g of 2-methoxyethylamine, and 3 g of triethylamine in 30 ml toluene is refluxed for 3 hours and evaporated to dryness under reduced pressure. The residue is treated with ice-water, basified with aqueous 2N sodium hydroxide and extracted with ethyl acetate. The organic layer is dried and evaporated. The residue is crystallized from ethyl acetate to give 3,5-dimethyl-6-($\beta$-methoxy-ethyl-amino)-4-oxo-4,5-dihydro-isothiazolo[5,4-d]pyrimidine of the formula

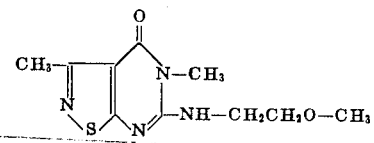

melting at 190°–192°.

EXAMPLE 26

The 3-methyl-4-oxo-5-(3-pyridyl)-6-chloro-4,5-dihydroisothiazolo[5,4-d]pyrimidine, prepared as described below, in 30 ml toluene is refluxed with 1 ml triethylamine and 1 ml morpholine for 2 hours and then evaporated to dryness. The residue is partitioned between water and ethyl acetate. The organic layer is dried over anhydrous sodium sulphate and evaporated. The residual oil is chromAtographed in benzene solution over a short column of alumina. The benzene eluate is evaporated to dryness and the residue triturated with ether. The solid is recrystallized from a mixture of ethyl acetate and hexane to give 3-methyl-5-(3-pyridyl)-6-(4-morpholino)-4-oxo-4,5-dihydro-isothiazolo[5,4-d]pyrimidine of the formula

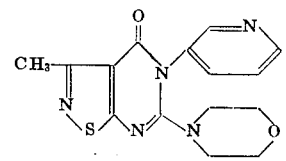

melting at 171°–174°. The starting material for the above synthesis is made as follows:

A mixture of 4.5 g of 3-methyl-4-carbethoxy-5-N-carbophenoxyamino isothiazole and 1.5 g of 3-amino pyridine is heated at 100° for 30 minutes. The solid product so obtained is digested with hexane and filtered. Recrystallization from dilute ethanol gives N-(3-pyridyl)-N'-(3-methyl-4-carbethoxy-5-isothiazolyl) urea melting at 244°–246°.

To a solution of 1 g of sodium in 50 ml ethanol is added 8 g of N-(3-pyridyl)-N'-(3-methyl-4-carbethoxy-5-isothiazolyl) urea and refluxed for 1 ½ hours. The alcohol is then removed under vacuum, the residue dissolved in water and acidified with hydrochloric acid. The product is filtered, washed with water and recrystallized from dilute ethanol to give 3-methyl-5-(3-pyridyl)-4,6-dioxo-4,5,6,7-tetrahydro isothiazolo[5,4-d]pyrimidine melting at 330°–332° (containing two moles of water of crystallization).

A mixture of 4 g of 3-methyl-4,6-dioxo-5-(3-pyridyl)-4,5,6,7--tetrahydro isothiazolo[5,4-d]pyrimidine, 30 ml of phosphorus oxychloride and 10 g phosphorus pentachloride is refluxed on an oil bath for 18 hours. The excess phosphorus oxychloride is distilled off under vacuum and the residue treated with crushed ice. It is then basified to pH 10 and extracted with methylene chloride. The organic layer is washed with water, dried over sodium sulfate and evaporated, to give 3-methyl-4-oxo-5-(3-pyridyl)-6-chloro-4,5-dihydroisothiazolo[5,4-d]pyrimidine.

EXAMPLE 27

The 3-methyl-4-oxo-5-(3-picolyl)-6-chloro-4,5-dihydroisothiazolo[5,4-d]pyrimidine, prepared as described below, in 35 ml toluene is treated with 2 ml triethylamine and 3 ml morpholine and mixture is refluxed for 2 hours and then evaporated to dryness in vacuo. The residue is taken in water and extracted with ethyl acetate. The organic layer is washed with water, dried over sodium sulfate and evaporated. The residual oil is chromatographed in chloroform solution over a short column of alumina. The chloroform eluate is evaporated to dryness and the oil treated with hydrogen chloride in isopropanol. The solid hydrochloride is recrystallized from a mixture of ethanol and ether to give 3-methyl-6-(4-morpholino)-5-(3-picolyl)-4-oxo-4,5-dihydro-isothiazolo[5,4-d]pyrimidine hydrochloride of the formula

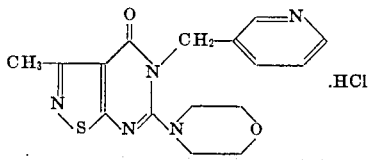

melting at 245°–250°. The starting material for the above synthesis is made as follows:

A mixture of 9 g of 3-methyl-4-carbethoxy-5-N-carbophenoxyamino isothiazole in 50ml ethanol and 3 g of 3-picolylamine is refluxed for 3 hours and then the alcohol removed in vacuo. Water is added to the residue and the solid filtered. It is recrystallized from a mixture of ethyl acetate and hexane to give N-(3-picolyl)-N'-(3-methyl-4-carbethoxy-5-isothiazolyl) urea melting at 172°–174°.

To a solution of 0.7 g sodium in 35 ml ethanol is added 7.0 g of N-(3-picolyl)-N'-(3-methyl-4-carbethoxy-5-isothiazolyl) urea and refluxed for 1 ½ hours, the alcohol removed under vacuo, the residue dissolved in water and acidified with hydrochloric acid. The product is filtered, washed with water and recrystallized from a mixture of ethyl acetate and hexane to give 3-methyl-4,6-dioxo-5-(3-picolyl)-4,5,67-tetrahydro isothiazolo[5,4-d]pyrimidine melting at 250°–252°. A mixture of 4 g of 3-methyl-4,6-dioxo-5-(3-picolyl)-4,5,6,7-tetrahydroisothiazolo[5,4-d]pyrimidine, 20 ml phosphorus oxychloride and 200 ml dimethyl aniline is refluxed for 5 hours. The excess phosphorus oxychloride is then distilled off in vacuo and the residue treated with crushed ice. It is then basified to pH 10 and extracted with methylene chloride. The organic layer is washed with water, dried over sodium sulfate and evaporated, to give 3-methyl-4-oxo-5-(3-picolyl)-6-chloro-4,5-dihydro isothiazolo[5,4-d]pyrimidine.

EXAMPLE 28

Tablets containing 0.05 g of the active substance are prepared as follows:

Ingredients (for 5000 tablets)

| | |
|---|---|
| 3-n-butyl-5-methyl-6-(4-morpholino)-4-oxo-4,5-dihydro-isothiazolo[5,4-d]pyrimidine | 250 g |
| Corn starch | 650 g |
| Talc | 70 g |
| Magnesium stearate | 30 g |
| Distilled water | q.s. |

The 3-n-butyl-5-methyl-6-(4-morpholino)-4-oxo-4,5-dihydro-isothiazolo[5.4-d]pyrimidine and 500 g of corn starch are well mixed together and treated with a paste prepared from 150 g of corn starch and 300 g of distilled water. The mass is well kneaded, granulated and dried at 45°C. A mixture of the talc and the magnesium stearate is added to the granulate and thoroughly mixed with the latter. The granulate is processed into tablets weighing 0.2 g.

EXAMPLE 29

According to the methods described herein, e.g. in an analogous manner to that described in Examples 1–27, the following compounds can be prepared:

a. 3-allyl-5-[2-(m-chlorophenyl)-ethyl]-6-amino-4-oxo-4,5-dihydro-isothiazolo[5,4-d]pyrimidine, b. 3-phenyl-5-(α-thenyl)-6-[2-(4-thiomorpholino)-ethylamino]-4-oxo-4,5-dihydro-isothiazolo[5,4-d]pyrimidine, c. 3-[2-(4-ethyl-piperazino)-ethyl]-5-(2-methoxyethyl)-6-[2-(4-morpholino)-ethylamino]-4-oxo-4,5-dihydro-isothiazolo[5,4-d]pyrimidine, d. 3(2-dimethylaminoethyl)-5-(cyclopent-1-enyl)-6-(4-phenyl-piperazino)-4-oxo-4,5-dihydro-isothiazolo[5,4-d]pyrimidine, e. 3-(p-chlorophenyl)-5-(α-quinolyl)-6-(2-hydroxyethylamino)-4-oxo-4,5-dihydro-isothiazolo[5,4-d]pyrimidine, f. 3-(2-methylthio-ethyl)-5-[2-(p-methoxyphenyl)-ethyl]-6-[4-(2-phenylethyl)-piperazino]-4-oxo-4,5-dihydro-isothiazolo[5,4-d]pyrimidine, g. 3-[2-(p-methoxyphenyl)-ethyl]-5-(α-thienyl)-6-(2-dimethylamino-ethylamino)-4-oxo-4,5-dihydro-isothiazolo[5,4-d]pyrimidine, h. 3-[2-(p-dimethylaminophenyl)-ethyl]-5-[2-(1-isoquinolyl)-ethyl]-6-(2-piperazino-ethylamino)-4-oxo-4,5-dihydro-isothiazolo[5,4-d]pyrimidine, i. 3-[2(o-nitrophenyl)-ethyl]-5-(2-morpholino-ethyl)-6-[4-(α-pyridyl)-piperazino]-4-oxo-4,5-dihydro-isothiazolo[5,4-d]pyrimidine, j. 3-(2-thiomorpholino-ethyl)-5-(2-piperazino-ethyl)-6-(2-pyrrolidino-ethylamino)-4-oxo-4,5-dihydro-isothiazolo[5,4-d]pyrimidine, k. 3-(2-morpholino-ethyl)-5-(3-furylmethyl)-6-(4-ethyl-piperazino-ethylamino)- 4-oxo-4,5-dihydro-isothiazolo[5,4-d]pyrimidine.

I claim:

1. A member selected from the group consisting of compounds of the formula

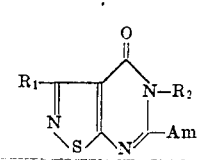

in which $R_1$ stands for a member selected from the group consisting of lower alkyl, lower alkyl substituted by a member selected from the group consisting of
lower alkoxy, lower alkylmercapto;

cycloalkyl and cycloalkyl-lower alkyl said cyclic members having 3 to 7 ring carbon atoms;

$R_2$ stands for a member selected from the group consisting of hydrogen, lower alkyl, lower alkyl substituted by a member selected from the group consisting of lower alkoxy, lower alkylmercapto, phenyl, phenyl-lower alkyl, phenyl and phenyl-lower alkyl substituted on the phenyl ring by a member selected from the group consisting of lower alkyl, lower alkoxy, lower alkylenedioxy, halogen, trifluoromethyl and nitro;

Am stands for a member selected from the group consisting of amino, lower alkylamino, hydroxy-lower alkylamino, lower alkoxy-lower alkylamino, alkyleneamino having three to eight ring members, morpholino, 2,6-dimethyl-morpholino, thiamorpholino, piperazino and lower alkyl or hydroxy-lower alkyl piperazino; and its pharmaceutically acceptable, non-toxic acid addition salts.

2. A product as claimed in claim 1 in which $R_1$ stands for a member selected from the group consisting of lower alkyl, cycloalkyl and cycloalkyl-lower alkyl in which the cyclic members have three to seven ring carbon atoms; $R_2$ stands for a member selected from the group consisting of hydrogen, lower alkyl, phenyl, phenyl-lower alkyl, phenyl and phenyl-lower alkyl substituted on the phenyl ring by a member selected from the group consisting of lower alkyl, lower alkoxy, lower alkylenedioxy, halogen, trifluoromethyl and nitro; Am stands for a member selected from the group consisting of amino, lower alkylamino, hydroxy-lower alkylamino, lower alkoxy-lower alkylamino, di-lower alkylamino, alkyleneamino having three to eight ring members, morpholino, thiamorpholino, piperazino and lower alkyl or hydroxy-lower alkyl piperazino.

3. A product as claimed in claim 1, in which Am stands for morpholino.

4. A product as claimed in claim 1, in which $R_1$ stands for a member selected from the group consisting of methyl, ethyl, n-propyl, iso-propyl, n-butyl, iso-butyl, n-pentyl, n-hexyl, n-heptyl and cyclopentylmethyl;

$R_2$ stands for a member selected from the group consisting of hydrogen, methyl, ethyl and n-butyl;

Am stands for a member selected from the group consisting of morpholino, 2,6-di-methyl-morpholino and thiamorpholino.

5. A product as claimed in claim 1, in which $R_1$ and $R_2$ stand for methyl and Am stands for a member selected from the group consisting of octahydroazocinyl, 2,5-dimethyl-pyrrolidino and piperidino.

6. A product as claimed in claim 1, in which $R_1$ and $R_2$ stand for methyl and Am stands for a member selected from the group consisting of 4-(2-hydroxyethyl)-1-piperazino, 4-methyl-1-piperazino and β-methoxy-ethylamino.

7. A product as claimed in claim 1, in which $R_1$ stands for methyl, $R_2$ stands for a member selected from the group consisting of 2-methyl-phenyl and 3-trifluoromethylphenyl and Am stands for a member selected from the group consisting of morpholino and dimethylamino.

8. A product as claimed in claim 1, in which $R_1$ stands for a member selected from the group consisting of methyl and ethyl, $R_2$ is 2-phenylethyl and Am stands for morpholino.

9. A product as claimed in claim 1, which is 3-n-butyl-5-methyl-6-(morpholino)-4-oxo-4,5-dihydro-isothiazolo[5,4-d]pyrimidine.

* * * * *